United States Patent
Chang et al.

(10) Patent No.: US 10,488,980 B2
(45) Date of Patent: Nov. 26, 2019

(54) EQUALIZING PARASITIC CAPACITANCE EFFECTS IN TOUCH SCREENS

(71) Applicant: Apple Inc., Cupertino, CA (US)

(72) Inventors: Shih-Chang Chang, Cupertino, CA (US); Steven P. Hotelling, Los Gatos, CA (US); Cheng-Ho Yu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 535 days.

(21) Appl. No.: 15/053,979

(22) Filed: Feb. 25, 2016

(65) Prior Publication Data

US 2016/0179252 A1 Jun. 23, 2016

Related U.S. Application Data

(63) Continuation of application No. 12/757,896, filed on Apr. 9, 2010, now Pat. No. 9,285,909.

(51) Int. Cl.
*G06F 3/041* (2006.01)
*G06F 3/044* (2006.01)

(52) U.S. Cl.
CPC .......... *G06F 3/04164* (2019.05); *G06F 3/044* (2013.01); *G06F 3/0412* (2013.01);
(Continued)

(58) Field of Classification Search
CPC ......... G06F 3/0412–0418; G06F 3/044; G06F 2203/04111; G06F 2203/04103
See application file for complete search history.

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

CN 1629688 A 6/2005
JP 2000-163031 A 6/2000
(Continued)

OTHER PUBLICATIONS

Chinese Search Report dated Dec. 3, 2014, for CN Application No. 201180016509, two pages.
(Continued)

*Primary Examiner* — David Tung
(74) *Attorney, Agent, or Firm* — Kubota & Basol LLP

(57) ABSTRACT

Reduction of the effects of differences in parasitic capacitances in touch screens is provided. A touch screen can include multiple display pixels with stackups that each include a first element and a second element. For example, the first element can be a common electrode, and the second element can be a data line. The display pixels can include a first display pixel including a third element connected to the first element, and the third element can contribute to a first parasitic capacitance between the first and second elements of the first display pixel, for example, by overlapping with the second element. The touch screen can also include a second display pixel lacking the third element. The second display pixel can include a second parasitic capacitance between the first and second elements of the second display pixel. The first and second parasitic capacitances can be substantially equal, for example.

24 Claims, 15 Drawing Sheets

(52) U.S. Cl.
CPC ......... *G06F 3/0443* (2019.05); *G06F 3/0446* (2019.05); *G06F 3/0448* (2019.05); *G06F 2203/04103* (2013.01); *G06F 2203/04107* (2013.01); *G06F 2203/04111* (2013.01)

(56) References Cited

U.S. PATENT DOCUMENTS

| | | |
|---|---|---|
| 5,796,448 A | 8/1998 | Kim |
| 5,825,352 A | 10/1998 | Bisset et al. |
| 5,835,079 A | 11/1998 | Shieh |
| 5,867,139 A * | 2/1999 | Tanaka ............... G09G 3/3648 345/92 |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,614,498 B1 | 9/2003 | Tanaka et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 7,705,834 B2 | 4/2010 | Swedin |
| 8,479,122 B2 | 7/2013 | Hotelling et al. |
| 9,285,909 B2 | 3/2016 | Tanaka et al. |
| 2002/0033924 A1 | 3/2002 | Matoba et al. |
| 2003/0043329 A1* | 3/2003 | Park ............... G02F 1/134363 349/141 |
| 2003/0174871 A1 | 9/2003 | Yoshioka et al. |
| 2004/0150629 A1 | 8/2004 | Lee |
| 2004/0252249 A1 | 12/2004 | Hong |
| 2005/0285983 A1 | 12/2005 | Chiang et al. |
| 2006/0097991 A1 | 5/2006 | Hotelling et al. |
| 2006/0197753 A1 | 9/2006 | Hotelling |
| 2007/0176905 A1 | 8/2007 | Shih et al. |
| 2008/0062148 A1* | 3/2008 | Hotelling ............ G02F 1/13338 345/174 |
| 2009/0058831 A1 | 3/2009 | Chen et al. |
| 2010/0110057 A1 | 5/2010 | Lee et al. |
| 2011/0242050 A1 | 10/2011 | Byun et al. |
| 2011/0248949 A1 | 10/2011 | Chang et al. |

FOREIGN PATENT DOCUMENTS

| | | |
|---|---|---|
| JP | 2002-342033 A | 11/2002 |
| JP | 2004-054961 A | 2/2004 |
| KR | 0163933 B1 | 1/1999 |
| KR | 1020030040449 A | 5/2003 |
| KR | 1020110112128 A | 10/2011 |
| TW | 200912713 A | 3/2009 |
| WO | WO-2011/127442 A2 | 10/2011 |

OTHER PUBLICATIONS

Final Office Action dated Aug. 2, 2013, for U.S. Appl. No. 12/757,896, filed Apr. 9, 2010, 10 pages.

Final Office Action dated Jul. 13, 2015, for U.S. Appl. No. 12/757,896, filed Apr. 9, 2010, 10 pages.

International Search Report dated Nov. 7, 2011, for PCT Application No. PCT/US2011/031839, filed Apr. 8, 2011, three pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action dated Dec. 13, 2012, for U.S. Appl. No. 12/757,896, filed Apr. 9, 2010, 13 pages.

Non-Final Office Action dated Oct. 10, 2014, for U.S. Appl. No. 12/757,896, filed Apr. 9, 2010, 11 pages.

Notice of Allowance dated Nov. 4, 2015, for U.S. Appl. No. 12/757,896, filed Apr. 9, 2010, seven pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engingeering, 364 pages.

* cited by examiner

EQUALIZING PARASITIC CAPACITANCE EFFECTS IN TOUCH SCREENS

CROSS REFERENCES TO RELATED APPLICATIONS

This application is a continuation of U.S. patent application Ser. No. 12/757,896, filed Apr. 9, 2010, and published on Oct. 13, 2011, as U.S. Patent Publication No. 2011/0248949, the contents of which is incorporated herein by reference in its entirety for all purposes.

FIELD OF THE DISCLOSURE

This relates generally to touch screens, and more particularly equalizing parasitic capacitance effects in touch screens.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing fields used to detect touch can extend beyond the surface of the display, and objects approaching near the surface may be detected near the surface without actually touching the surface.

Capacitive touch sensor panels can be formed from a matrix of drive and sense lines of a substantially transparent conductive material, such as Indium Tin Oxide (ITO), often arranged in rows and columns in horizontal and vertical directions on a substantially transparent substrate. It is due in part to their substantial transparency that capacitive touch sensor panels can be overlaid on a display to form a touch screen, as described above. Some touch screens can be formed by integrating touch sensing circuitry into a display pixel stackup (i.e., the stacked material layers forming the display pixels).

SUMMARY

The following description includes examples in which the effects of parasitic capacitances in touch screens can be equalized, i.e., the effects of differences in parasitic capacitances can be reduced or eliminated. Equalization of parasitic capacitance effects may be accomplished by, for example, selecting a particular placement of one or more conductive elements in the touch screen. Some touch screen designs, for example, can include different types of display pixels, each type including different elements within the display pixel stackup. A first type of display pixel may include a conductive element that forms a parasitic capacitance with another element that has an effect on the operation of the touch screen. For example, a first type of display pixel may include a touch sensing circuit element, which can be part of the touch sensing system, that forms a parasitic capacitance with a display circuit element, which can be part of the display system, that has the effect of reducing the luminance of all the display pixels associated with that particular display circuit element. A second type of display pixel might not include the conductive element and, thus, may have no parasitic capacitance associated with the display circuit element. Selecting the placement of the conductive element can include, for example, placing display pixels of the first type within the touch screen layout such that the effect of the conductive elements' parasitic capacitances is equally distributed among the display system circuit elements of the touch screen. In this way, for example, a reduced luminance effect of parasitic capacitances in certain display pixels can be equalized in the touch screen.

In some examples, selecting the placement of one or more conductive elements can include modifying conductive elements of display pixels at particular locations in a touch screen layout. For example, in order to equalize the effect of a parasitic capacitance in one display pixel, a parasitic capacitance in another display pixel can be formed or modified by adding and/or removing one or more additional conductive elements in the stackup of the second display pixel. In other words, in some examples, the particular placement of conductive elements can be selected through adding and/or removing conductive elements at particular locations in a touch screen layout. In this way, for example, an effect of a parasitic capacitance, such as a reduced luminance effect, in certain display pixels can be equalized in the touch screen.

DETAILED DESCRIPTION

Figure 1C:
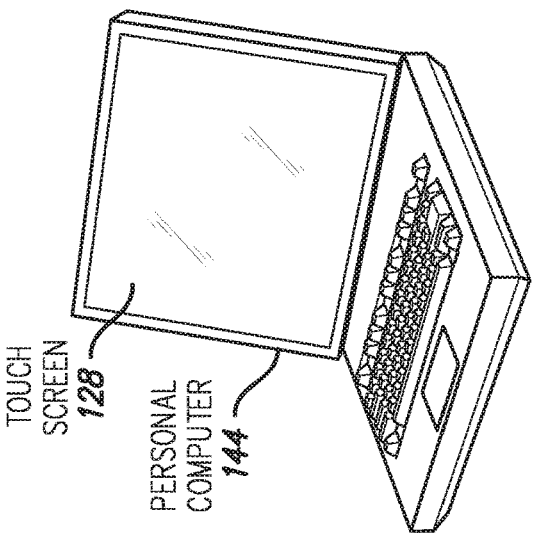
FIGS. 1A-1C illustrate an example mobile telephone, an example media player, and an example personal computer that each include an example touch screen according to embodiments of the disclosure.

In the following description of example embodiments, reference is made to the accompanying drawings which form a part hereof, and in which it is shown by way of illustration specific embodiments in which embodiments of the disclosure can be practiced. It is to be understood that other embodiments can be used and structural changes can be made without departing from the scope of the embodiments of this disclosure.

The following description includes examples in which the effects of parasitic capacitances in touch screens can be equalized, i.e., the effects of differences in parasitic capacitances can be reduced or eliminated. As touch sensing circuitry becomes more closely integrated with circuitry of other systems, undesirable interaction between circuit elements of different systems can be more likely to occur. For example, touch sensing circuitry can be integrated into the display pixel stackups of integrated touch screens. Display pixel stackups are typically manufactured by processes including depositing, masking, etching, doping, etc., of materials such as conductive materials (e.g., metal, substantially transparent conductors), semiconductive materials (e.g., polycrystalline silicon (Poly-Si)), and dielectric materials (e.g., SiO2, organic materials, SiNx). Various elements formed within a display pixel stackup can operate as circuitry of the display system to generate an image on the display, while other elements can operate as circuitry of a touch sensing system that senses one or more touches on or near the display.

The display pixel stackups of integrated touch screens can include conductive circuit elements that can be close enough to other circuit elements to create parasitic capacitances. For instance, a circuit element in a display pixel stackup, such as a voltage line, a data line, a plate of a capacitor, a common electrode, a conductive black mask, etc., can partially or completely overlap with another circuit element located in a different material layer (e.g., at a different height in the stackup) such that a parasitic capacitance can be formed between the two circuit elements. Parasitic capacitances can cause undesirable effects in the operation of one or more systems of a touch screen, such as reduced luminance, color aberrations, reduced touch sensitivity, etc. Differences in parasitic capacitance effects among display pixels of a touch screen can reduce image quality by causing, for example, visual artifacts in displayed images. For example, visual artifacts can result when a parasitic capacitance occurs in one or more display pixels in one region of a touch screen, but the parasitic capacitance does not occur in display pixels in another region. If the parasitic capacitance effectively reduces the luminance in the display pixels in the first region, the difference in luminance between the two regions may be seen as a visual artifact in some images.

The following description includes examples in which the effects of differences in parasitic capacitances can be equalized, i.e., reduced or eliminated. Because parasitic capacitances can be formed between conductive elements in a touch screen, equalization of parasitic capacitance effects may be accomplished by, for example, selecting a particular placement of one or more conductive elements in the touch screen. Some touch screen designs, for example, can include different types of display pixels, each type including different elements within the display pixel stackup. A first type of display pixel may include a conductive element that forms a parasitic capacitance with another element that has an effect on the operation of the touch screen. For example, a first type of display pixel may include a touch sensing circuit element, which can be part of the touch sensing system, that forms a parasitic capacitance with a display circuit element, which can be part of the display system, that has the effect of reducing the luminance of all the display pixels associated with that particular display circuit element. A second type of display pixel might not include the conductive element and, thus, may have no parasitic capacitance associated with the display circuit element. Selecting the placement of the conductive element can include, for example, placing display pixels of the first type within the touch screen layout such that the effect of the conductive elements' parasitic capacitances is equally distributed among the display system circuit elements of the touch screen. In this way, for example, a reduced luminance effect of parasitic capacitances in certain display pixels can be equalized in the touch screen.

In some examples, selecting the placement of one or more conductive elements can include modifying conductive elements of display pixels at particular locations in a touch screen layout. For example, in order to equalize the effect of a parasitic capacitance in one display pixel, a parasitic capacitance in another display pixel can be formed or modified by adding and/or removing one or more additional conductive elements in the stackup of the second display pixel. In other words, in some examples, the particular placement of conductive elements can be selected through adding and/or removing conductive elements at particular locations in a touch screen layout. In this way, for example, an effect of a parasitic capacitance, such as a reduced luminance effect, in certain display pixels can be equalized in the touch screen.

Figure 1B:
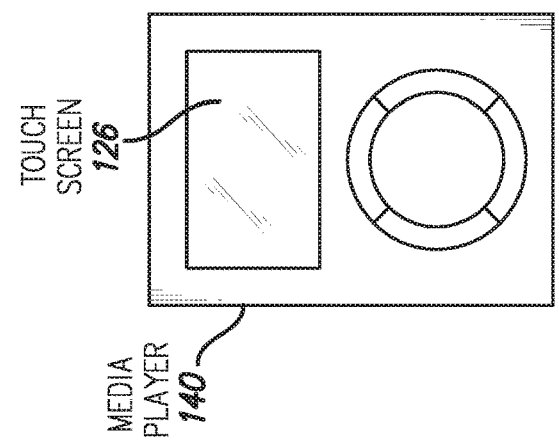
Figure 1A:
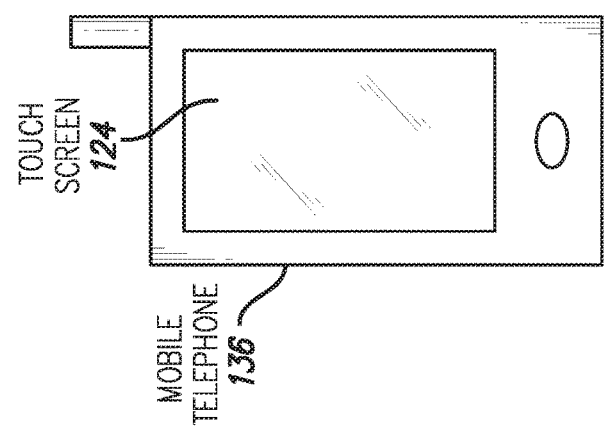

FIGS. 1A-1C show example systems in which a touch screen according to embodiments of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. Touch screens 124, 126, and 128 may be based on, for example, self capacitance or mutual capacitance, or another touch sensing technology in which effects of parasitic capacitances can be equalized. For example, in a self capacitance based touch system, an individual electrode with a self-capacitance to ground can be used to form a touch pixel for detecting touch. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by a touch sensing system to determine the positions of multiple objects when they touch the touch screen. A mutual capacitance based touch system can include, for example, drive regions and sense regions, such as drive lines and sense lines. For example, drive lines can be formed in rows while sense lines can be formed in columns (e.g., orthogonal). Touch pixels can be formed at the intersections of the rows and columns. During operation, the rows can be stimulated with an AC waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some embodiments, a touch screen can be multi-touch, single touch, projection scan, full-imaging multi-touch, or any capacitive touch.

Figure 2:
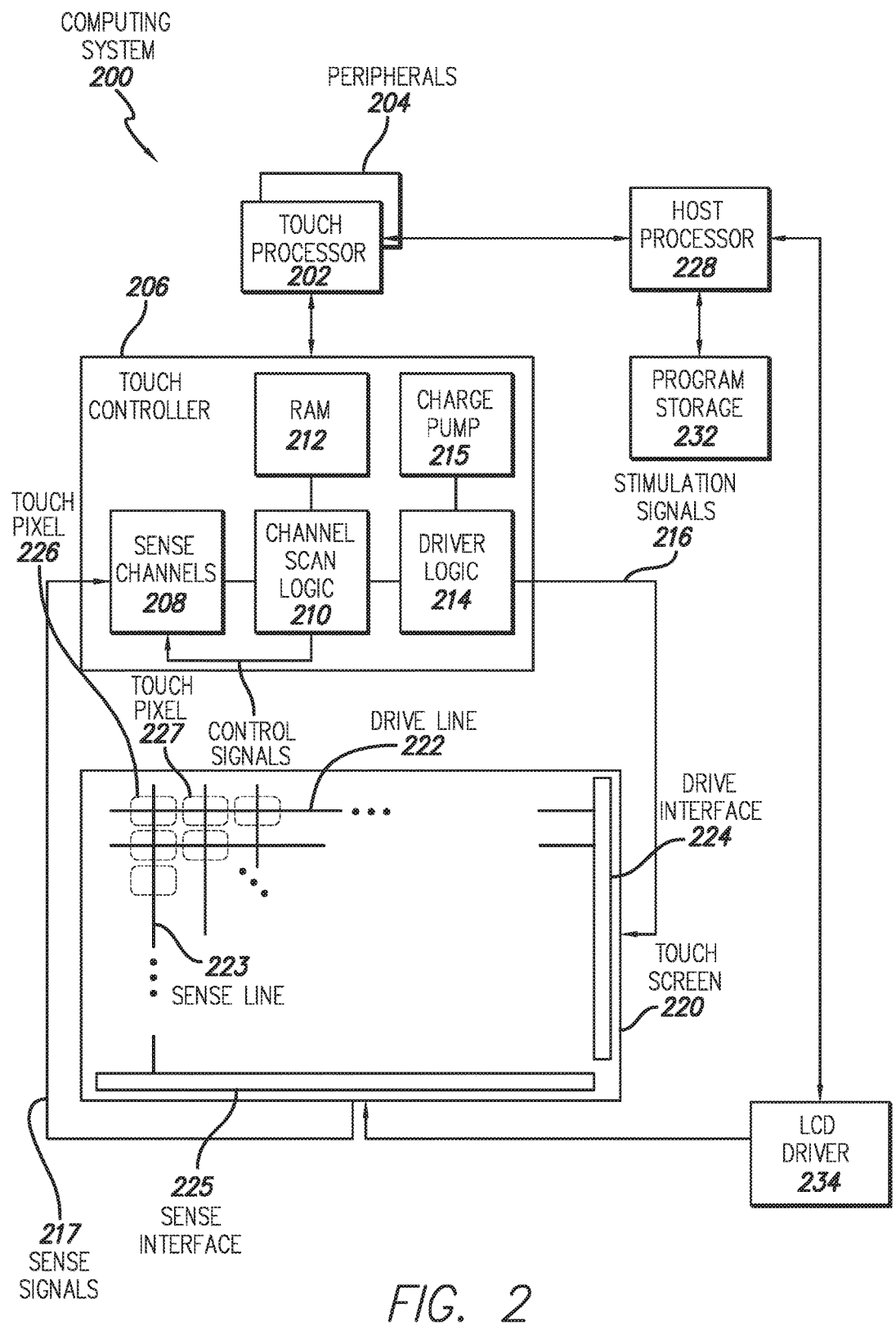
FIG. 2 is a block diagram of an example computing system that illustrates one implementation of an example touch screen according to embodiments of the disclosure.

FIG. 2 is a block diagram of an example computing system 200 that illustrates one implementation of an example touch screen 220 according to embodiments of the disclosure. Computing system 200 could be included in, for example, mobile telephone 136, digital media player 140, personal computer 144, or any mobile or non-mobile computing device that includes a touch screen. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and phases that can be selectively applied to drive regions of the touch sensing circuitry of touch screen 220, as described in more detail below. In some embodiments, touch controller 206, touch processor 202 and peripherals 204 can be integrated into a single application specific integrated circuit (ASIC).

Computing system 200 can also include a host processor 228 for receiving outputs from touch processor 202 and performing actions based on the outputs. For example, host processor 228 can be connected to program storage 232 and a display controller, such as an LCD driver 234. Host processor 228 can use LCD driver 234 to generate an image on touch screen 220, such as an image of a user interface (UI), and can use touch processor 202 and touch controller 206 to detect a touch on or near touch screen 220, such a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Touch screen 220 can include touch sensing circuitry that can include a capacitive sensing medium having a plurality of drive lines 222 and a plurality of sense lines 223. It should be noted that the term "lines" is a sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 (also referred to as an event detection and demodulation circuit) in touch controller 206. In this way, drive lines and sense lines can be part of the touch sensing circuitry that can interact to form capacitive sensing nodes, which can be thought of as touch picture elements (touch pixels), such as touch pixels 226 and 227. This way of understanding can be particularly useful when touch screen 220 is viewed as capturing an "image" of touch. In other words, after touch controller 206 has determined whether a touch has been detected at each touch pixel in the touch screen, the pattern of touch pixels in the touch screen at which a touch occurred can be thought of as an "image" of touch (e.g. a pattern of fingers touching the touch screen).

Figure 3:
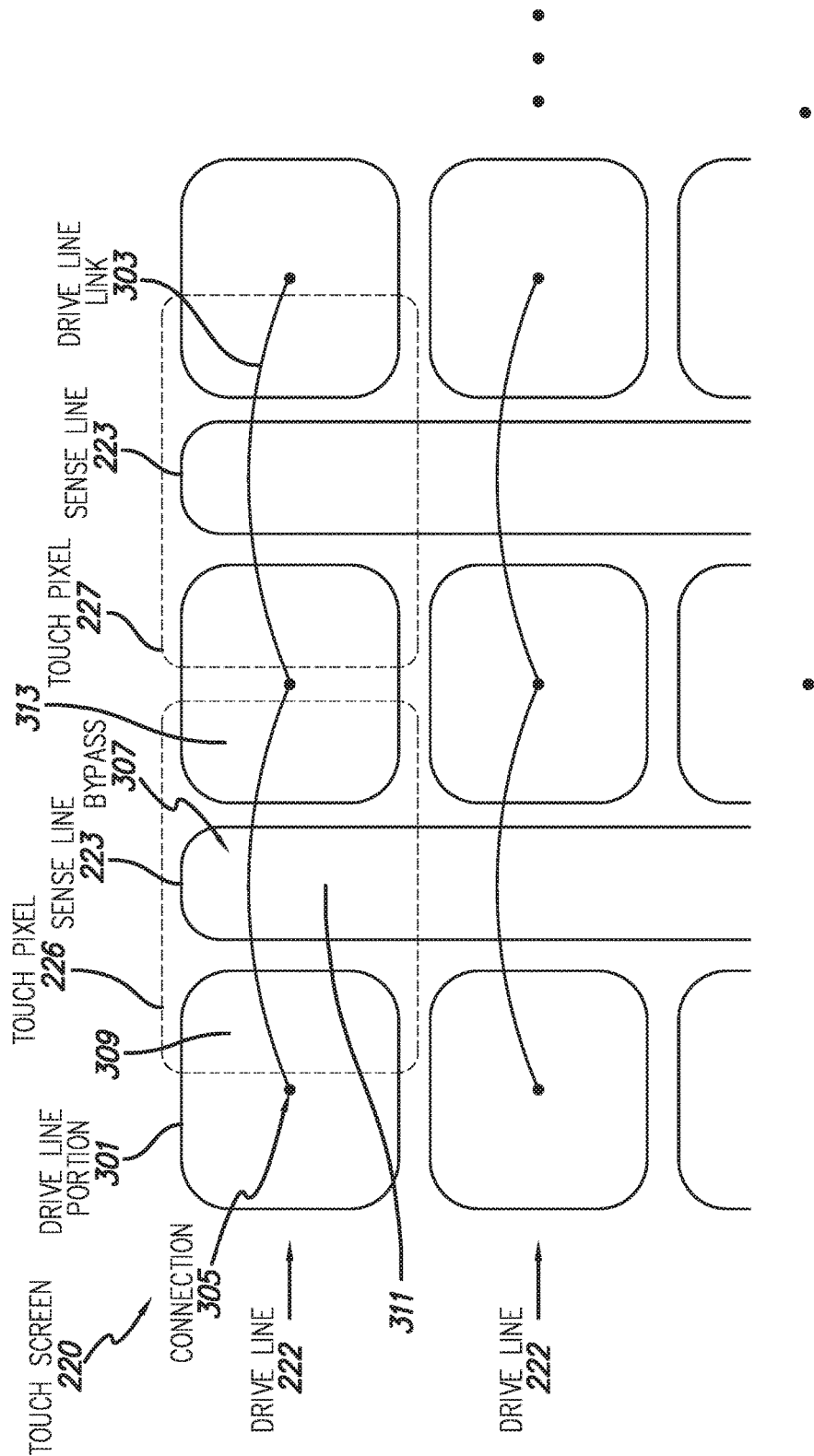
FIG. 3 is a more detailed view of the touch screen of FIG. 2 showing an example configuration of drive lines and sense lines according to embodiments of the disclosure.

In some example embodiments, touch screen 220 can be an integrated touch screen in which touch sensing circuit elements of the touch sensing system can be integrated into the display pixels stackups of a display. An example integrated touch screen in which embodiments of the disclosure can be implemented with now be described with reference to FIGS. 3-6. FIG. 3 is a more detailed view of touch screen 220 showing an example configuration of drive lines 222 and sense lines 223 according to embodiments of the disclosure. As shown in FIG. 3, each drive line 222 can be formed of one or more drive line segments 301 that can be electrically connected by drive line links 303 at connections 305. Drive line links 303 are not electrically connected to sense lines 223, rather, the drive line links can bypass the sense lines through bypasses 307. Drive lines 222 and sense lines 223 can interact capacitively to form touch pixels such as touch pixels 226 and 227. Drive lines 222 (i.e., drive line segments 301 and corresponding drive line links 303) and sense lines 223 can be formed of electrical circuit elements in touch screen 220. In the example configuration of FIG. 3, each of touch pixels 226 and 227 can include a portion of one drive line segment 301, a portion of a sense line 223, and a portion of another drive line segment 301. For example, touch pixel 226 can include a right-half portion 309 of a drive line segment on one side of a portion 311 of a sense line, and a left-half portion 313 of a drive line segment on the opposite side of portion 311 of the sense line.

Figure 4:
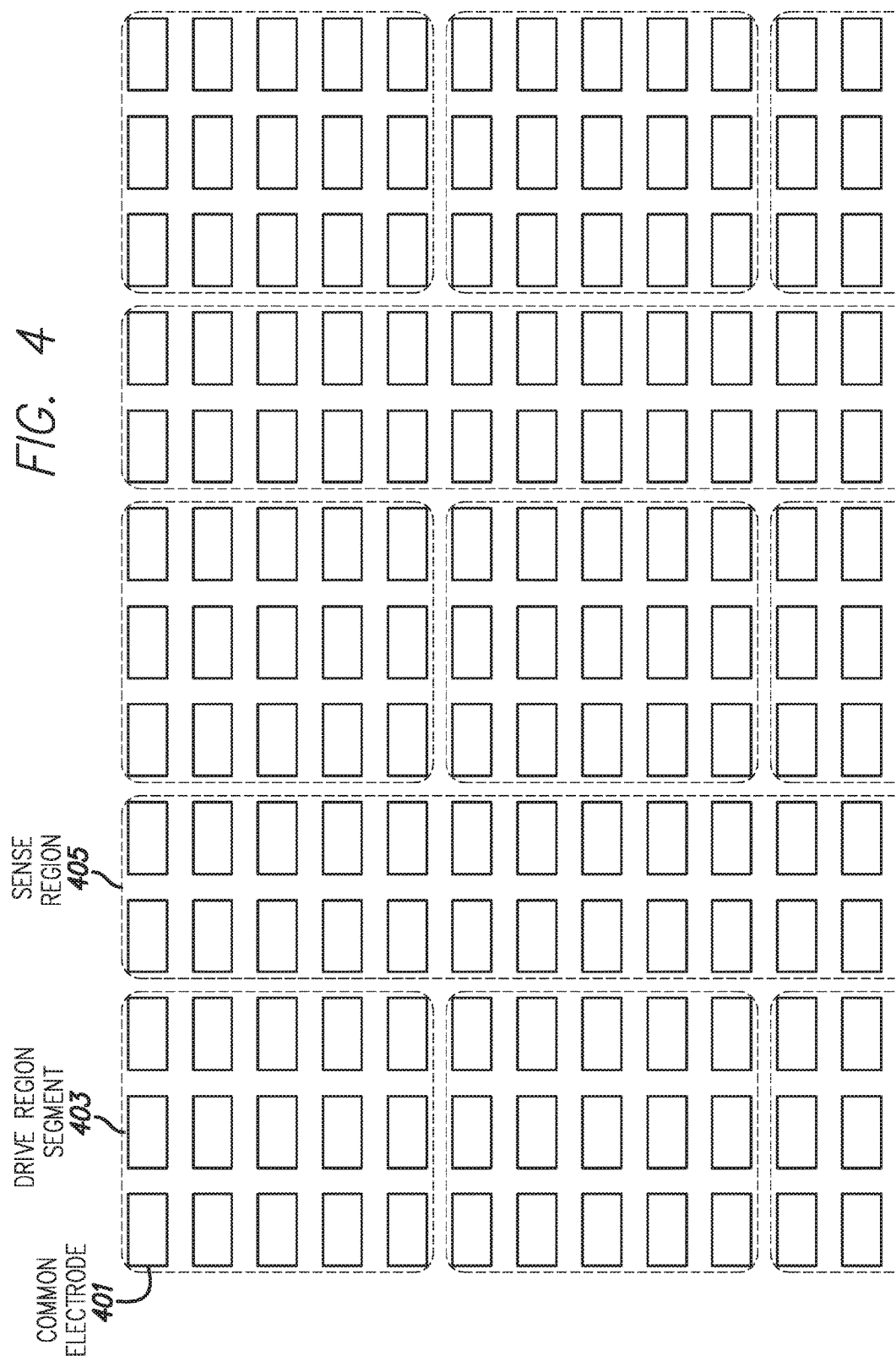
FIG. 4 illustrates an example configuration in which touch sensing circuitry includes common electrodes (Vcom) according to embodiments of the disclosure.

The circuit elements can include, for example, elements that can exist in conventional LCD displays, as described above. It is noted that circuit elements are not limited to whole circuit components, such a whole capacitor, a whole transistor, etc., but can include portions of circuitry, such as only one of the two plates of a parallel plate capacitor. FIG. 4 illustrates an example configuration in which common electrodes (Vcom) can form portions of the touch sensing circuitry of a touch sensing system. Each display pixel includes a common electrode 401, which is a circuit element of the display system circuitry in the pixel stackup (i.e., the stacked material layers forming the display pixels) of the display pixels of some types of conventional LCD displays, e.g., fringe field switching (FFS) displays, that can operate as part of the display system to display an image.

In the example shown in FIG. 4, each common electrode (Vcom) 401 can serve as a multi-function circuit element that can operate as display circuitry of the display system of touch screen 220 and can also operate as touch sensing circuitry of the touch sensing system. In this example, each common electrode 401 can operate as a common electrode of the display circuitry of the touch screen, and can also operate together when grouped with other common electrodes as touch sensing circuitry of the touch screen. For example, a group of common electrodes 401 can operate together as a capacitive part of a drive line or a sense line of the touch sensing circuitry during the touch sensing phase. Other circuit elements of touch screen 220 can form part of the touch sensing circuitry by, for example, electrically connecting together common electrodes 401 of a region, switching electrical connections, etc. In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some embodiments, some of the circuit elements in the display pixel stackups can be multi-function circuit elements and other circuit elements may be single-function circuit elements. In other embodiments, all of the circuit elements of the display pixel stackups may be single-function circuit elements.

In addition, although example embodiments herein may describe the display circuitry as operating during a display phase, and describe the touch sensing circuitry as operating during a touch sensing phase, it should be understood that a display phase and a touch sensing phase may be operated at the same time, e.g., partially or completely overlap, or the display phase and touch phase may operate at different times. Also, although example embodiments herein describe certain circuit elements as being multi-function and other circuit elements as being single-function, it should be understood that the circuit elements are not limited to the particular functionality in other embodiments. In other words, a circuit element that is described in one example embodiment herein as a single-function circuit element may be configured as a multi-function circuit element in other embodiments, and vice versa.

For example, FIG. 4 shows common electrodes 401 grouped together to form drive region segments 403 and sense regions 405 that generally correspond to drive line segments 301 and sense lines 223, respectively. Grouping multi-function circuit elements of display pixels into a region can mean operating the multi-function circuit elements of the display pixels together to perform a common function of the region. Grouping into functional regions may be accomplished through one or a combination of approaches, for example, the structural configuration of the system (e.g., physical breaks and bypasses, voltage line configurations), the operational configuration of the system (e.g., switching circuit elements on/off, changing voltage levels and/or signals on voltage lines), etc.

Multi-function circuit elements of display pixels of the touch screen can operate in both the display phase and the touch phase. For example, during a touch phase, common electrodes 401 can be grouped together to form touch signal lines, such as drive regions and sense regions. In some embodiments circuit elements can be grouped to form a continuous touch signal line of one type and a segmented touch signal line of another type. For example, FIG. 4 shows one example embodiment in which drive region segments 403 and sense regions 405 correspond to drive line segments 301 and sense lines 223 of touch screen 220. Other configurations are possible in other embodiments, for example, common electrodes 401 could be grouped together such that drive lines are each formed of a continuous drive region and sense lines are each formed of a plurality of sense region segments linked together through connections that bypass a drive region.

The drive regions in the example of FIG. 3 are shown in FIG. 4 as rectangular regions including a plurality of common electrodes of display pixels, and the sense regions of FIG. 3 are shown in FIG. 4 as rectangular regions including a plurality of common electrodes of display pixels extending the vertical length of the LCD. In some embodiments, a touch pixel of the configuration of FIG. 4 can include, for example, a 64×64 area of display pixels. However, the drive and sense regions are not limited to the shapes, orientations, and positions shown, but can include any suitable configurations according to embodiments of the disclosure. It is to be understood that the display pixels used to form the touch pixels are not limited to those described above, but can be any suitable size or shape to permit touch capabilities according to embodiments of the disclosure.

Figure 5:
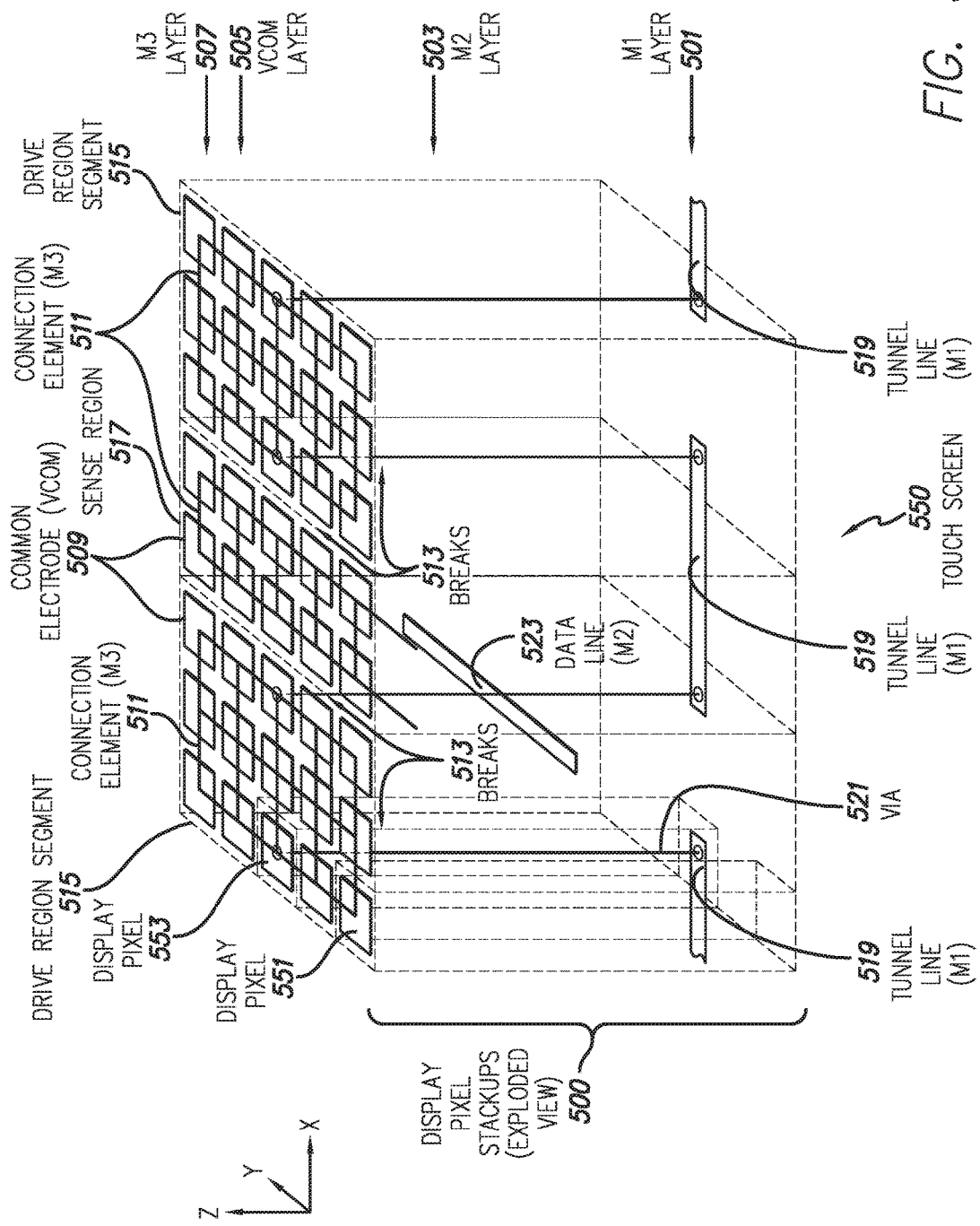
FIG. 5 illustrates an exploded view of display pixel stackups according to embodiments of the disclosure.

FIG. 5 is a three-dimensional illustration of an exploded view (expanded in the z-direction) of example display pixel stackups 500 showing some of the elements within the pixel stackups of an example integrated touch screen 550. Stackups 500 can include a configuration of conductive lines that can be used to group common electrodes, such as common electrodes 401, into drive region segments and sense regions, such as shown in FIG. 4, and to link drive region segments to form drive lines. Some embodiments can include other regions, such as a grounding region between drive lines and/or between drive lines and sense lines, as illustrated in the example embodiment shown in FIG. 12B.

Stackups 500 can include elements in a first metal (M1) layer 501, a second metal (M2) layer 503, a common electrode (Vcom) layer 505, and a third metal (M3) layer 507. Each display pixel can include a common electrode 509, such as common electrodes 401 in FIG. 4, that is formed in Vcom layer 505. M3 layer 507 can include connection element 511 that can electrically connect together common electrodes 509. In some display pixels, breaks 513 can be included in connection element 511 to separate different groups of common electrodes 509 to form drive region segments 515 and a sense region 517, such as drive region segments 403 and sense region 405, respectively. Breaks 513 can include breaks in the x-direction that can separate drive region segments 515 from sense region 517, and breaks in the y-direction that can separate one drive region segment 515 from another drive region segment. M1 layer 501 can include tunnel lines 519 that can electrically connect together drive region segments 515 through connections, such as conductive vias 521, which can electrically connect tunnel line 519 to the grouped common electrodes in drive region segment display pixels. Tunnel line 519 can run through the display pixels in sense region 517 with no connections to the grouped common electrodes in the sense region, e.g., no vias 521 in the sense region. M2 layer 503 can include data lines 523. Only one data line 523 is shown for the sake of clarity; however, a touch screen can include multiple data lines running through each vertical row of pixels, for example, one data line for each red, green, blue (RGB) color sub-pixel in each pixel in a vertical row of an RGB display integrated touch screen.

Structures such as connection elements 511, tunnel lines 519, and conductive vias 521 can operate as a touch sensing circuitry of a touch sensing system to detect touch during a touch sensing phase of the touch screen. Structures such as data lines 523, along with other pixel stackup elements such as transistors, pixel electrodes, common voltage lines, data lines, etc. (not shown), can operate as display circuitry of a display system to display an image on the touch screen during a display phase. Structures such as common electrodes 509 can operate as multifunction circuit elements that can operate as part of both the touch sensing system and the display system.

For example, in operation during a touch sensing phase, stimulation signals can be transmitted through a row of drive region segments 515 connected by tunnel lines 519 and conductive vias 521 to form electric fields between the stimulated drive region segments and sense region 517 to create touch pixels, such as touch pixel 226 in FIG. 2. In this way, the row of connected together drive region segments 515 can operate as a drive line, such as drive line 222, and sense region 517 can operate as a sense line, such as sense line 223. When an object such as a finger approaches or touches a touch pixel, the object can affect the electric fields extending between the drive region segments 515 and the sense region 517, thereby reducing the amount of charge capacitively coupled to the sense region. This reduction in charge can be sensed by a sense channel of a touch sensing controller connected to the touch screen, such as touch controller 206 shown in FIG. 2, and stored in a memory along with similar information of other touch pixels to create an "image" of touch.

Figure 6:
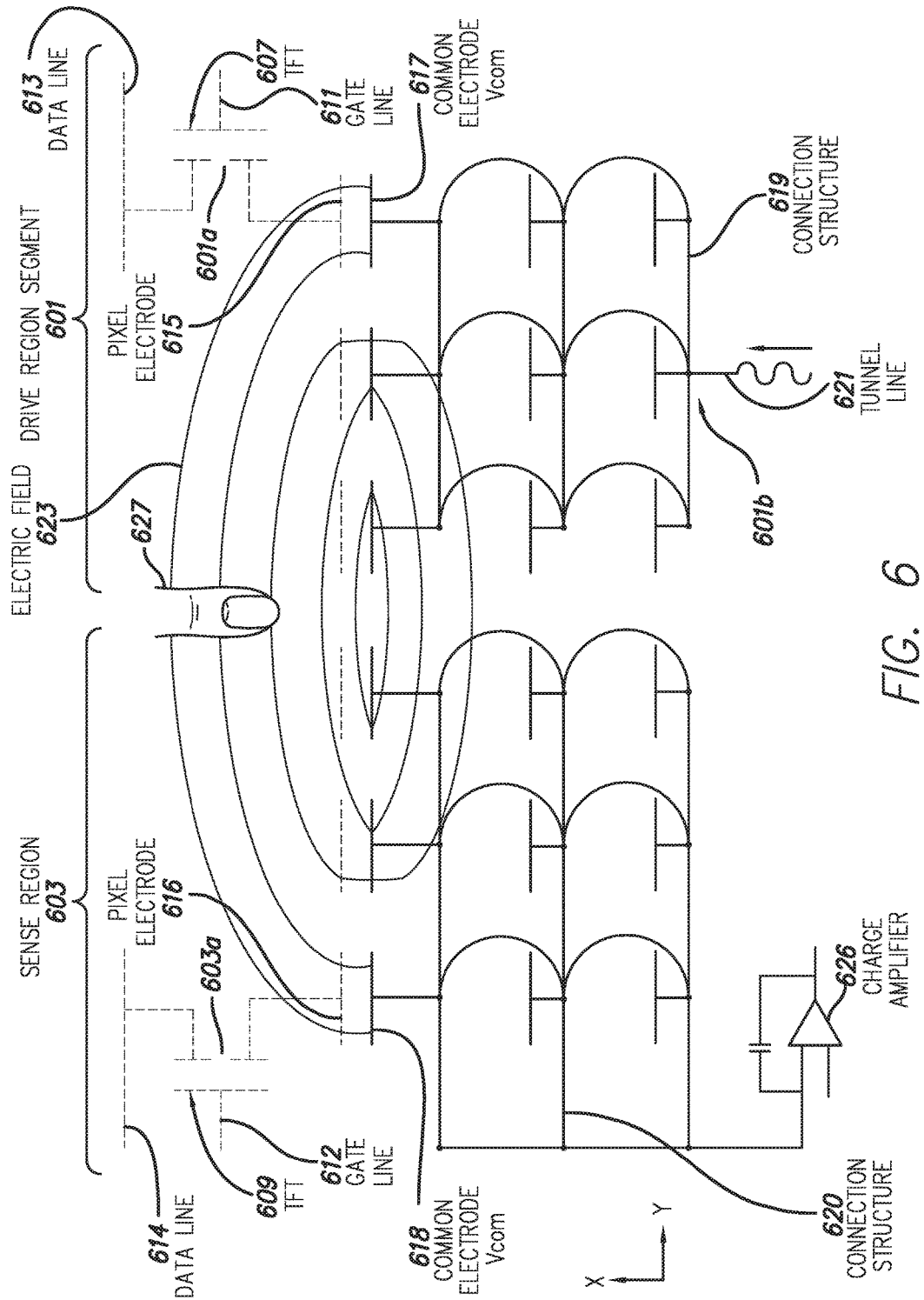
FIG. 6 Illustrates an example touch sensing operation according to embodiments of the disclosure.

A touch sensing operation according to embodiments of the disclosure will be described with reference to FIG. 6. FIG. 6 shows partial circuit diagrams of some of the touch sensing circuitry within display pixels in a drive region segment 601 and a sense region 603 of an example touch screen according to embodiments of the disclosure. For the sake of clarity, only one drive region segment is shown. Also for the sake of clarity, FIG. 6 includes circuit elements illustrated with dashed lines to signify some circuit elements operate primarily as part of the display circuitry and not the touch sensing circuitry. In addition, a touch sensing operation is described primarily in terms of a single display pixel 601a of drive region segment 601 and a single display pixel 603a of sense region 603. However, it is understood that other display pixels in drive region segment 601 can include the same touch sensing circuitry as described below for display pixel 601a, and the other display pixels in sense region 603 can include the same touch sensing circuitry as described below for display pixel 603a. Thus, the description of the operation of display pixel 601a and display pixel 603a can be considered as a description of the operation of drive region segment 601 and sense region 603, respectively.

Referring to FIG. 6, drive region segment 601 includes a plurality of display pixels including display pixel 601a. Display pixel 601a can include a TFT 607, a gate line 611, a data line 613, a pixel electrode 615, and a common electrode 617. FIG. 6 shows common electrode 617 connected to the common electrodes in other display pixels in drive region segment 601 through a connection element 619 within the display pixels of drive region segment 601 that is used for touch sensing as described in more detail below. Sense region 603 includes a plurality of display pixels including display pixel 603a. Display pixel 603a includes a TFT 609, a gate line 612, a data line 614, a pixel electrode 616, and a common electrode 618. FIG. 6 shows common electrode 618 connected to the common electrodes in other display pixels in sense region 603 through a connection element 620 that can be connected, for example, in a border region of the touch screen to form an element within the display pixels of sense region 603 that is used for touch sensing as described in more detail below.

During a touch sensing phase, drive signals can be applied to common electrodes 617 through a tunnel line 621 that is electrically connected to a portion of connection element 619 within a display pixel 601b of drive region segment 601. The drive signals, which are transmitted to all common electrodes 617 of the display pixels in drive region segment 601 through connection element 619, can generate an electrical field 623 between the common electrodes of the drive region segment and common electrodes 618 of sense region 603, which can be connected to a sense amplifier, such as a charge amplifier 626. Electrical charge can be injected into the structure of connected common electrodes of sense region 603, and charge amplifier 626 converts the injected charge into a voltage that can be measured. The amount of charge injected, and consequently the measured voltage, can depend on the proximity of a touch object, such as a finger 627, to the drive and sense regions. In this way, the measured voltage can provide an indication of touch on or near the touch screen.

Referring again to FIG. 5, it can be seen from FIG. 5 that some display pixels of touch screen 550 include different elements than other display pixels. For example, a display pixel 551 can include a portion of connection element 511 that has breaks 513 in the x-direction and the y-direction, and display pixel 551 does not include tunnel line 519. A display pixel 553 can include a portion of connection element 511 that has a break 513 in the x-direction, but not in the y-direction, and can include a portion of tunnel line 519 and a via 521. Other display pixels can include other differences in the configuration of stackup elements including, for example, no breaks 513 in connection element 511, a portion of tunnel line 519 without a via 521, etc. As described above, differences in the configurations of the elements in display pixel stackups that result in different parasitic capacitances within the touch screen can cause undesirable effects, such as visual artifacts.

FIGS. 7-13 illustrate example configurations of display pixels, example methods for manufacturing the display pixels, and an example touch pixel layout according to embodiments of the disclosure. FIGS. 7-10 illustrate a side-by-side view of an example set of display pixels in different stages of manufacture, simply for ease of comparison. FIGS. 12A-B illustrate an example touch screen and an example layout of display pixels for one example touch pixel according to embodiments of the disclosure. FIGS. 11A-C and 13 illustrate details of example placement of elements in the stackup of display pixels according to embodiments of the disclosure.

FIGS. 7-10 illustrate example display pixel stackups of a set of ten example display pixels (labeled pixel_A, pixel_B, . . . pixel_H, pixel_G2, and pixel_H2) according to embodiments of the disclosure. Example manufacturing processes for forming the example display pixels and the configurations of various elements in the stackups of the display pixels will now be described. After the description of the manufacture and structure of the display pixels, different placements of various elements within the stackups of the display pixels that can reduce or eliminate the effects of differences in parasitic capacitances among the display pixels will be described with reference to FIGS. 7-10 and additional reference to FIGS. 11A-C, 12A-B, and 13. In the following description, processes and structures common to all of display pixels A-H2 may be described with respect to a single display pixel, simply for the purpose of clarity. In addition, for the sake of clarity, the following description omits some processing, such as the formation of insulating layers, the formation of vias, etc., that one skilled in the art can readily understand would occur during the manufacturing process.

Figure 7:
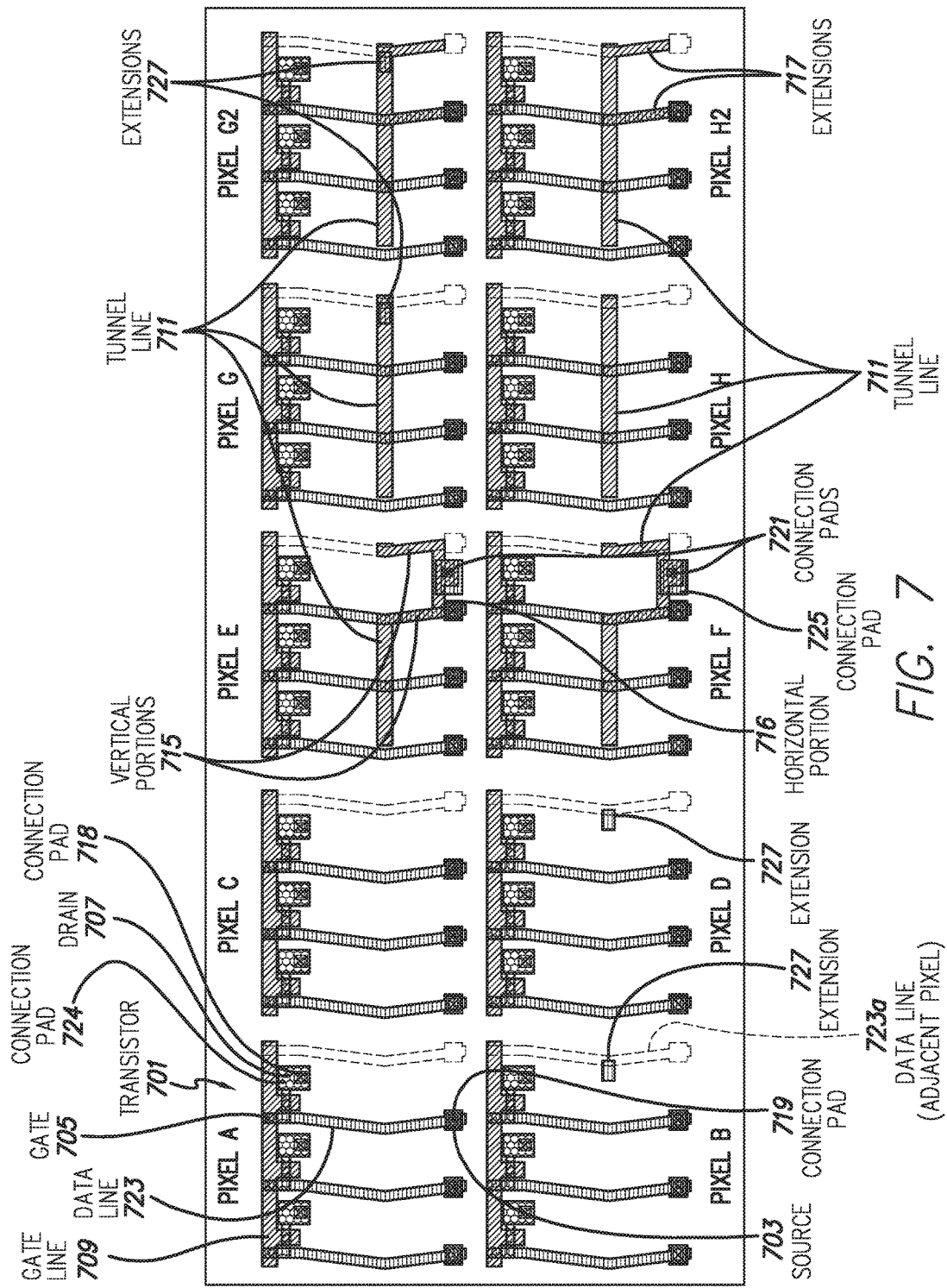
FIGS. 7-10 illustrate example display pixels in different stages of manufacture according to embodiments of the disclosure.

FIG. 7 shows earlier stages of the example processing including forming a poly-silicon layer, including circuit elements of the transistors 701, such as, a source 703, a gate 705, and a drain 707. It is noted that some elements of the display pixels illustrated in FIGS. 7-10 may be functionally associated with an adjacent pixel, rather than the display pixel in which the element is located. For example, source 703, which is shown in FIG. 7 as being located in pixel_A, operates as a source of a transistor of a pixel adjacent to pixel_A. In this regard, it is further noted that the example display pixels are shown slightly separated from each other in the figures. However, when manufactured in a touch screen layout, the borders of each display pixel adjoin with the borders adjacent display pixels to form contiguous rows (in the x-direction) and columns (in the y-direction) of display pixels. In this regard, many of the lines shown in each individual display pixel are merely portions of lines that can extend through many display pixels.

For example, the manufacturing process can include depositing conductive material to form gate lines 709 in an M1 layer of all display pixels, and forming a tunnel line 711 in the M1 layer of display pixels E-H2. When manufactured in a touch screen layout, such as the layout shown in FIG. 12B, gate lines 709 in each display pixel connect to adjacent display pixels in the x-direction to form a gate line that can run through an entire row of display pixels. Tunnel lines 711 in display pixels E, F, G, H, G2, and H2 run in the x-direction primarily through the midline of the display pixels. However, part of tunnel lines 711 of display pixels E and F can divert away from the midline such that part of the tunnel line runs through the bottom-right corner of each display pixel E and F. More specifically, vertical portions 715 of tunnel line 711 in each of display pixels E and F can connect the parts of tunnel line 711 positioned at the midline to a horizontal portion 716 of the tunnel line positioned in the bottom-right corner of the display pixel. In pixels G2 and H2, the M1 layer can also include extensions 717 of the conductive material that extend from tunnel line 711 in each of the G2 and H2 display pixels.

A first connection (CON1) layer can be formed by depositing conductive material on sources 703 and drains 707 in all of the display pixels to form connection pads 718 and 719, respectively. In display pixels E and F, the deposition of conductive material of the CON1 layer can also include a connection pad 721 deposited on horizontal portion 716 of tunnel line 711.

A second metal (M2) layer can be formed by depositing conductive material to form three data lines 723 in each display pixel. Connection pads 724 can be formed of conductive material of the M2 layer deposited on connection pads 718. In display pixels E and F, connection pads 725 can be formed of conductive material of the M2 layer deposited on connection pads 721. In each of pixels B, D, G, and G2, the M2 layer can also include an extension 727 to a data line of an adjacent display pixel, labeled as data line 723a and illustrated with a dashed line in FIG. 7.

Figure 8:
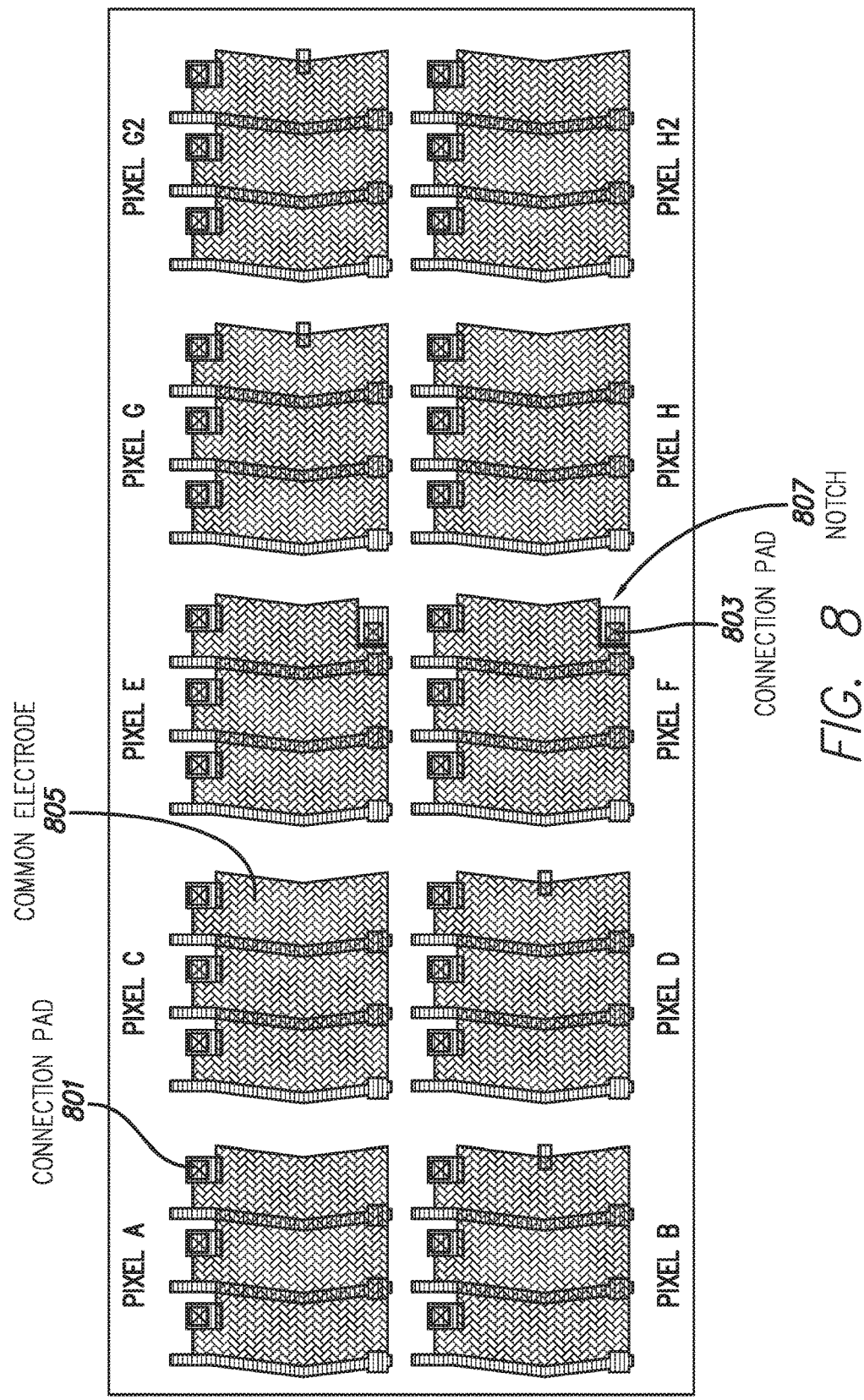

FIG. 8 illustrates additional stages of the example processing. For reference, the M2 layer is also shown. Connection pads 801 can be formed by depositing conductive material of a second connection (CON2) layer on connection pads 724 of the M2 layer. In pixels E and F, connection pads 803 can be formed by depositing conductive material of the CON2 layer on connection pads 725 of the M2 layer.

A layer (Vcom layer) of conductive material can be deposited to form a common electrode 805 in each pixel. In each of pixels E and F, common electrode 805 can include a notch 807 to allow a direct connection between connection pad 803 and a third metal layer, which will be described new in reference to FIG. 9.

Figure 9:
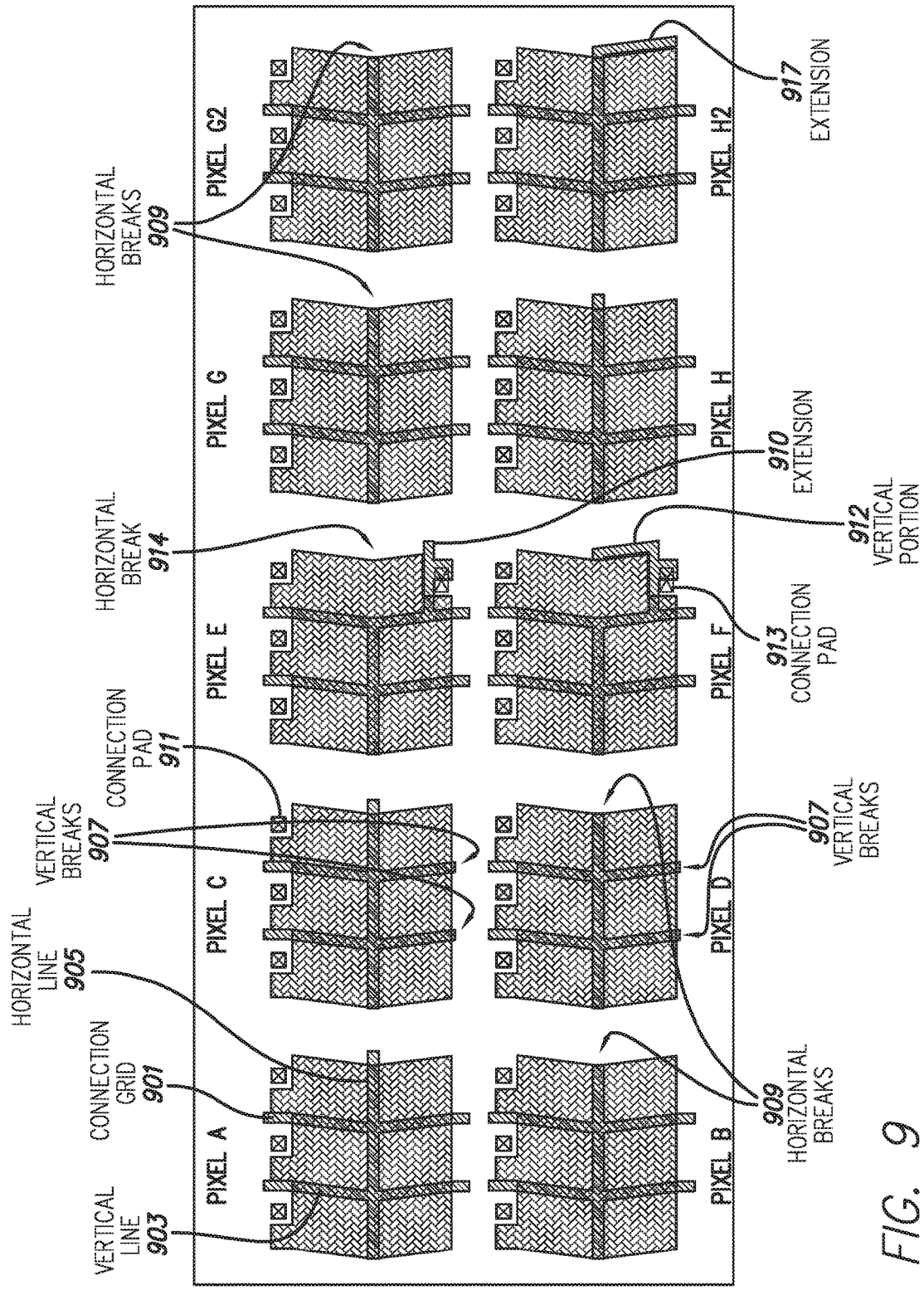

FIG. 9 illustrates additional stages of the example processing. For reference, the Vcom layer is also shown. Connection grids 901 can be formed by depositing a conductive material of a third metal (M3) layer on common electrodes 805 to form an electrical connection with the common electrodes. Connection grid 901 of each display pixel can include vertical lines 903 and horizontal lines 905 that can connect to the connection grids in two, three, or four adjacent display pixels, depending on the configuration of the vertical and horizontal lines of the display pixel and/or on the configurations of the vertical and horizontal connection grid lines of the adjacent pixels. For example, the vertical and horizontal lines of connection grids 901 of display pixels A, F, H, and H2 extend to the vertical and horizontal borders, respectively, of these display pixels. Therefore, connection grids 901 of pixels A, F, H, and H2 can connect at all four borders to the connection grids of adjacent display pixels that extend to the corresponding pixel borders. Thus, common electrodes 805 of pixels A, F, H, and H2 can be electrically connected to the common electrodes of up to four adjacent display pixels. Connection grid 901 of pixel H2 includes an extension 917, described in more detail below.

Vertical lines 903 of connection grid 901 of display pixel C can include vertical breaks 907, such that the connection grid of pixel C is disconnected from the connection grid of the display pixel adjacent to pixel C's lower border. Therefore, common electrode 805 of display pixel C can be electrically connected to the common electrodes of up to three adjacent display pixels, i.e., adjacent pixels to the left, right, and above. In display pixels B, G, and G2, horizontal lines 905 of connection grids 901 can include horizontal breaks 909. In display pixel E, horizontal line 905 can include a portion of one of vertical lines 903 of the connection grid, such that the right-hand portion of the horizontal line can connect to connection pad 803 in the lower right-hand corner of pixel E. Horizontal line 905 of pixel E includes an extension 910 that extends further to the right of connection pad 803, as described in more detail below. However, because the right-hand side of horizontal line 905 of pixel E ends in the lower right-hand corner of the display pixel, the horizontal line does not connect with a connection grid horizontal line of a display pixel adjacent to the right border of pixel E, i.e., the horizontal line of pixel E includes a horizontal break 914. (In contrast, horizontal line 905 of pixel F includes a vertical portion 912 that can connect to the connection grid horizontal line of a right-adjacent display pixel.) Therefore, the connection grids of pixels B, E, G, and G2 are disconnected from the connection grids of the display pixels adjacent to the right border, and common electrodes 805 of display pixels B, E, G, and G2 can be electrically connected to the common electrodes of up to three adjacent display pixels, i.e., adjacent pixels to the left, above, and below. Display pixel D includes vertical breaks 907 and horizontal breaks 909, such that the connection grid of pixel D is disconnected from the connection grids of the display pixels adjacent to the lower border and the right border. Therefore, common electrode 805 of display pixel D can be electrically connected to the common electrodes of up to two adjacent display pixels, i.e., adjacent pixels to the left and above.

Connection pads 911 can be formed by depositing conductive material of a third connection (CON3) layer on connection pads 801 of the CON2 layer. In pixels E and F, connection pads 913 can be formed can be formed by depositing conductive material of the CON3 layer on connection pads 803 of the CON2 layer.

Figure 10:
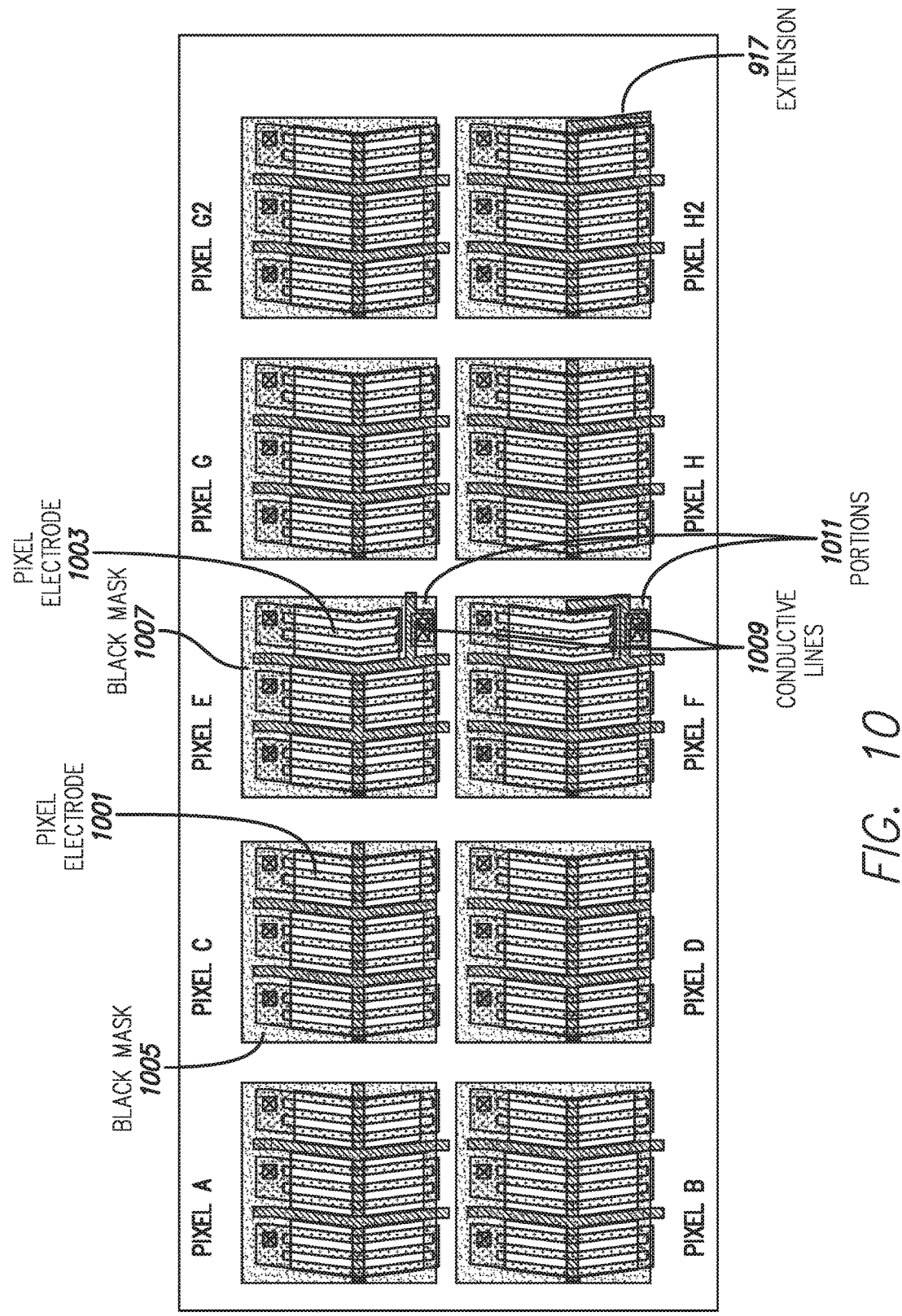

FIG. 10 illustrates additional stages of the example processing. For reference, the M3 and CONS layers are also shown. Pixel electrodes 1001 and 1003 can be formed of a conductive material, and black masks 1005 and 1007 can be formed of an opaque material. Pixel electrodes 1003 can cover a smaller area than pixel electrodes 1001 due to the structure formed by connection pads 721, 725, 803, and 913, which together can form a conductive line 1009, such as via 521 in FIG. 5, that can electrically connect tunnel line 711 and connection grid 901 in each of pixels E and F. Thus, pixels E and F can be referred to as contact pixels. Black masks 1007 in pixels E and F can include portions 1009 that cover the area over electrical connections 1009.

Other connections between layers can include connection pad 719, which can electrically connect a source 703 and a data line 723, and a conductive line formed by connection pads 718, 724, 801, and 911, which can electrically connect a drain 707 and a pixel electrode 1001 or 1003.

Various placements of elements within the stackups of the display pixels described above can reduce or eliminate the effects of differences in parasitic capacitances among the display pixels when the display pixels are arranged into touch pixels of a touch screen, as will now be described with reference to FIGS. 7-10 and additional reference to FIGS. 11A-C, 12A-B, and 13.

As described above, display pixels B, D, G, and G2 can include horizontal breaks 909, and display pixel E can include a horizontal break 914, in the conductive grids in order to separate regions of connected-together common electrodes. However, in other pixels that do not include horizontal breaks 909, the horizontal line 905 extends to the adjacent pixel at the right border, and therefore, the portion of the horizontal line in, for example, display pixels A, C, and H, can overlap with a portion of a right-adjacent display pixel's data line 723a. Thus, there can be an additional parasitic capacitance in display pixels A, C, and H caused by this additional overlap versus display pixels B, D, E, G, and G2, which do not include the portion of the horizontal line 905 because of horizontal breaks 909 and 914. The additional parasitic capacitance caused by the extra overlap of horizontal lines 905 in display pixels A, C, and H can be referred to as an additional parasitic capacitance between the Vcom and the data lines 723a because the horizontal lines, which can be in the M3 layer, can be electrically connected to common electrodes 805 in the Vcom layer in this example. This additional parasitic capacitance between Vcom and data lines 723a can have an effect on the operation of all of the display pixels associated with these data lines. For example, the effect can be a reduction of the luminance of all of the display pixels in the column of display pixels through which the affected data lines 723a run. Differences in the luminance of columns of display pixels of a touch screen can degrade the quality of images by, for example, creating visual artifacts.

Figure 11A:
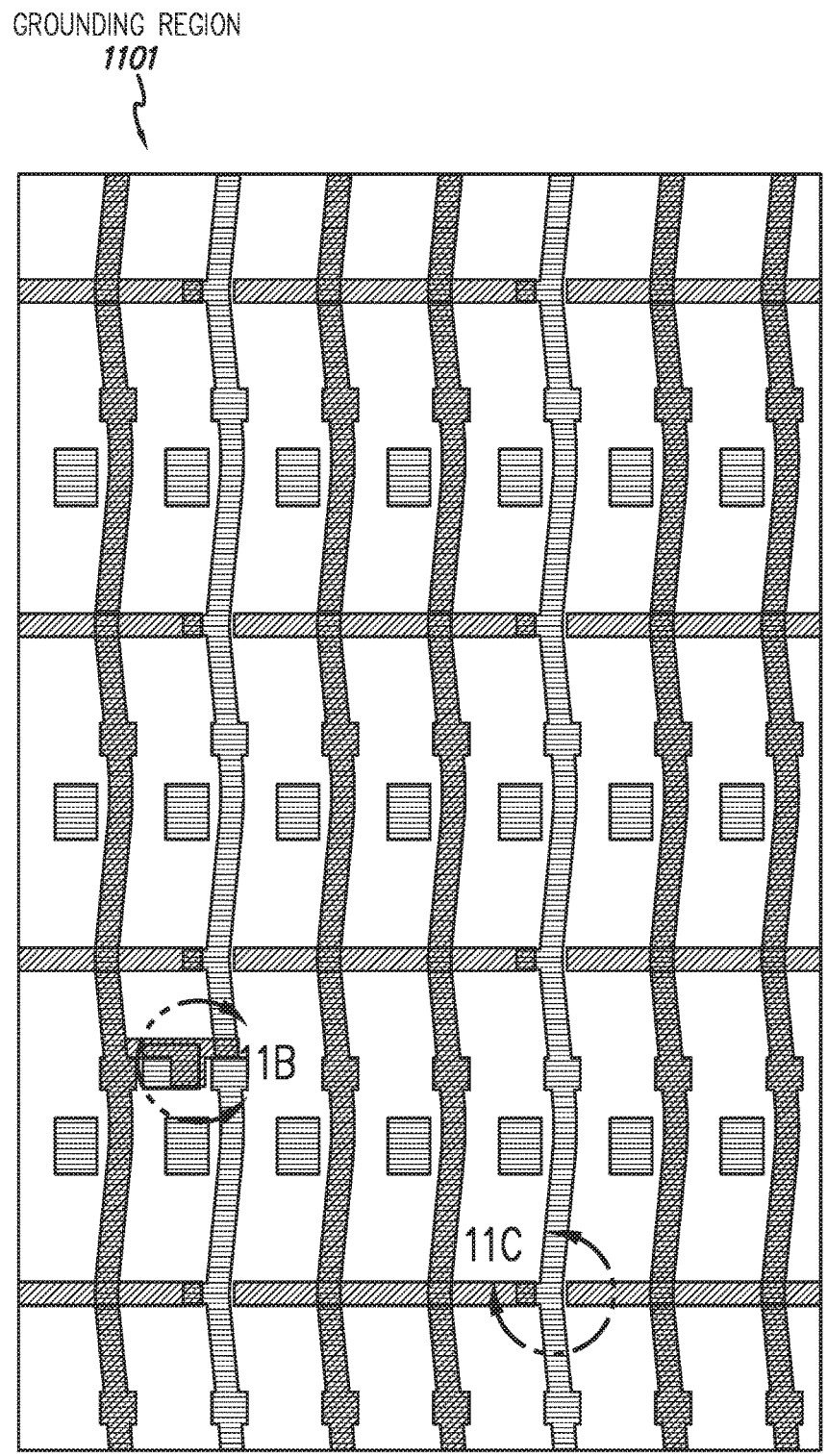
FIGS. 11A-C illustrate more details of example additional elements in the stackups of display pixels according to embodiments of the disclosure.
Figure 11B:
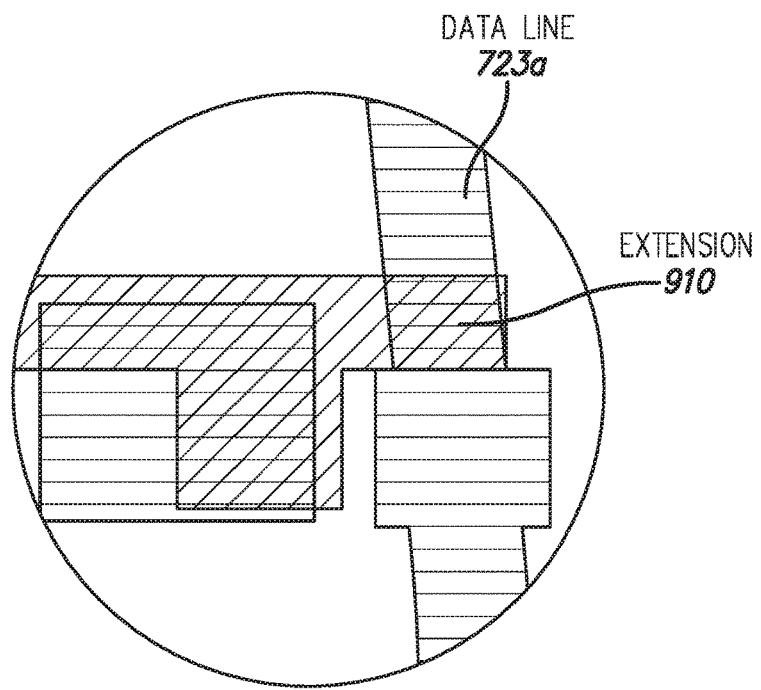
Figure 11C:
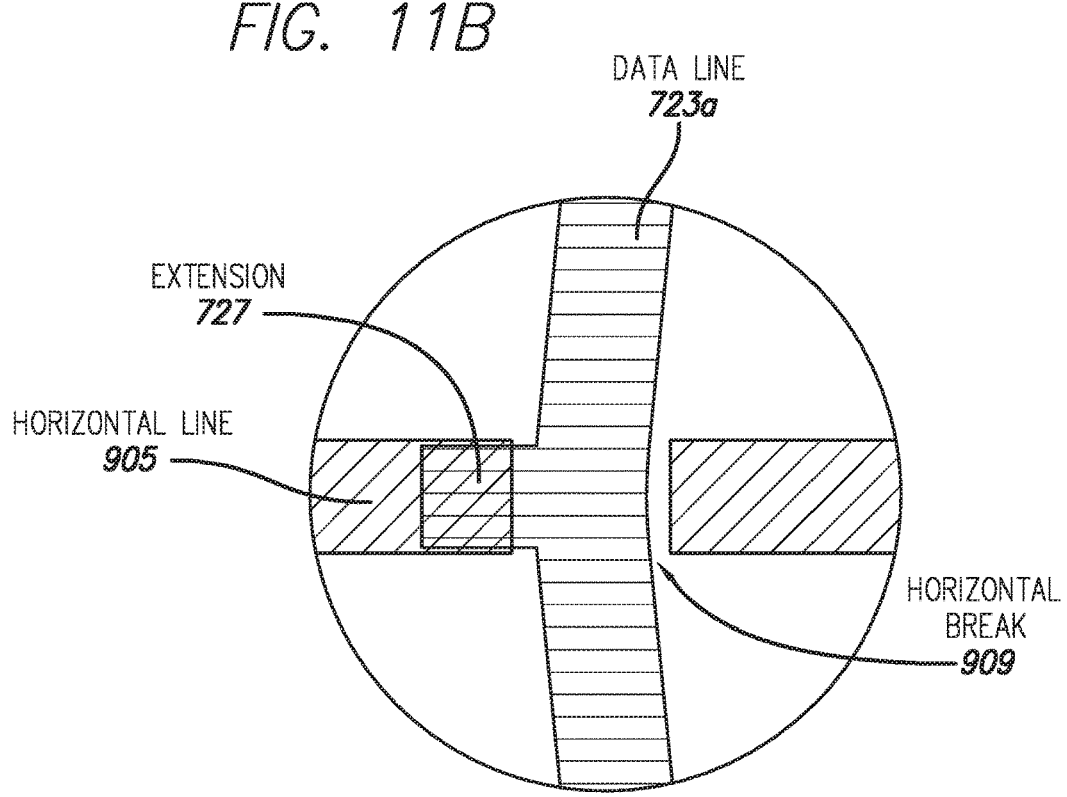

However, placement of additional elements in the stackups of other display pixels (i.e., extensions 727, in the stackups of pixels B, D, G, and G2, and extension 910 in pixel E) can help balance the differences in parasitic capacitance between Vcom and the data lines caused by the configuration of horizontal lines 905 in pixels A, C, and H in this example embodiment. Referring to FIGS. 7 and 11A-C, extensions 727 (also referred to as, e.g., "wings" or "wing structures") of data lines 723a in display pixels B, D, G, and G2 can create an additional overlap of data lines 723a with the Vcom layer of the display pixels. FIG. 11A-C illustrate more detail of an example configuration according to embodiments of the disclosure, including an example grounding region 1101 that includes some pixels with horizontal lines 905 including horizontal breaks 909, and also including extensions 727 of data lines 723a. In this way, for example, a parasitic capacitance between the data lines and the Vcom layer can be added in the pixels that include a horizontal break 909 in connection grid 901, i.e., the B, D, G, and G2 pixels in this example, to reduce or eliminate the effect of the parasitic capacitance between the data lines and the Vcom layer in the pixels that do not include the horizontal break, e.g., the pixels A, C, and H. In particular, in this example, the parasitic capacitance effect can be reduced or eliminated by placement of additional elements that can create an additional parasitic capacitance in pixels B, D, G, and G2 that balances an existing parasitic capacitance elsewhere in a touch screen, such as in display pixels A, C, and H.

Because the configuration of horizontal line 905 in pixel E differs from the configuration in pixels B, D, G, and G2, a different placement of an additional element can be made in this example. Referring to FIGS. 9 and 11B, placement of extension 910 of horizontal line 905 of pixel E can create an overlap of a portion of the M3 layer in pixel E with data line 723a, which can create an additional parasitic capacitance that can approximate the parasitic capacitance of pixels A, C, and H. FIG. 11B illustrates more detail of extension 910. In this way, for example, a parasitic capacitance between the data line and the Vcom layer can be added in pixel E to reduce or eliminate the effect of the parasitic capacitance between the data line and the Vcom layer in pixels A, C, and H. This can be another example of reducing or eliminating the parasitic capacitance effect by placement of additional elements that can create an additional parasitic capacitance in one location in a touch screen, i.e., in the stackup of pixel E, that can balance an existing parasitic capacitance elsewhere in the touch screen, such as in pixels A, C, and H.

Modifying stackup elements of some display pixels of a touch screen to balance a parasitic capacitance in other display pixels of the touch screen can allow for more of the display pixels in the touch screen to have substantially the same parasitic capacitance. This may, for example, allow greater flexibility in the arrangement of the display pixels in a touch screen, i.e., the specific placement of the different types of display pixels into a layout of the touch screen.

Horizontal line 905 of display pixel F can include vertical portion 912, as described above, that can provide a connection between connection grid 901 of pixel F and the connection grid of a right-adjacent pixel. Similar to display pixels A, C, and H, this M3 layer connection to the right-adjacent pixel can result in an overlap of a portion of the M3 layer and data line 723a. In some embodiments, additional elements may be placed in the stackups of all of the other types of display pixels to add parasitic capacitances that balance the parasitic capacitance due to the overlap of vertical portion 912 and data line 723a in pixel F. In this case, all of the types of display pixels can be balanced to have the same, or substantially the same, parasitic capacitance with respect to data line 723a and Vcom.

However, the overlap of vertical portion 912 and data line 723a can be much greater than the overlap in pixels A, C, and H (and in pixels B, D, E, G, and G2 after the addition of extensions 727 and 910). Therefore, the overlap in pixel F can create a much higher parasitic capacitance than the parasitic capacitances in the other, unmodified display pixels. It may be undesirable to increase the parasitic capacitance in all other types of display pixels to balance the parasitic capacitance in pixel F. In one example embodiment described in more detail below in reference to FIGS. 12A-B and 13, the effect of the parasitic capacitance in pixel F can be reduced or eliminated, in part, by placing the F pixels in a particular arrangement in a touch pixel layout. In this way, for example, the need to place additional elements in other display pixels may be reduced or eliminated in some embodiments.

Figure 12A:
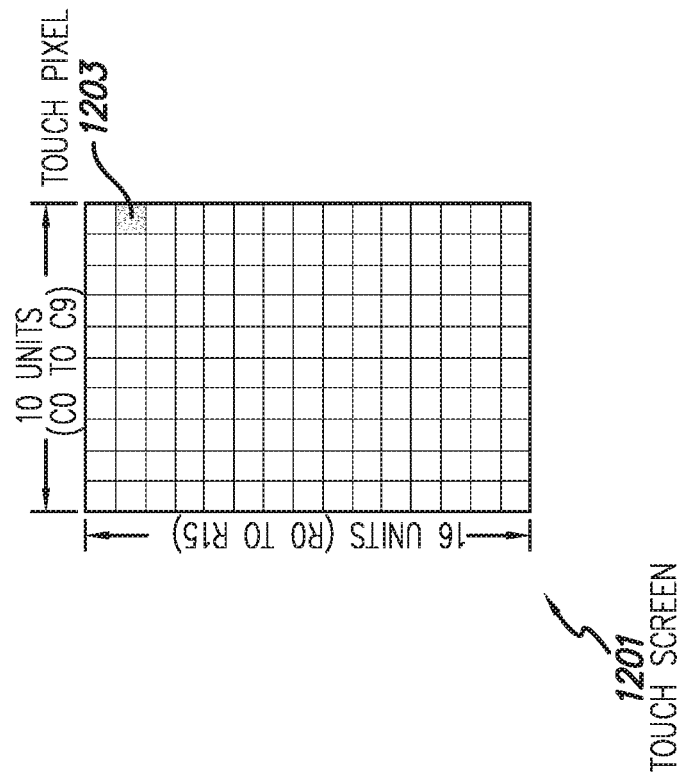
FIGS. 12A-B illustrate an example touch screen and an example touch pixel according to embodiments of the disclosure.
Figure 12B:
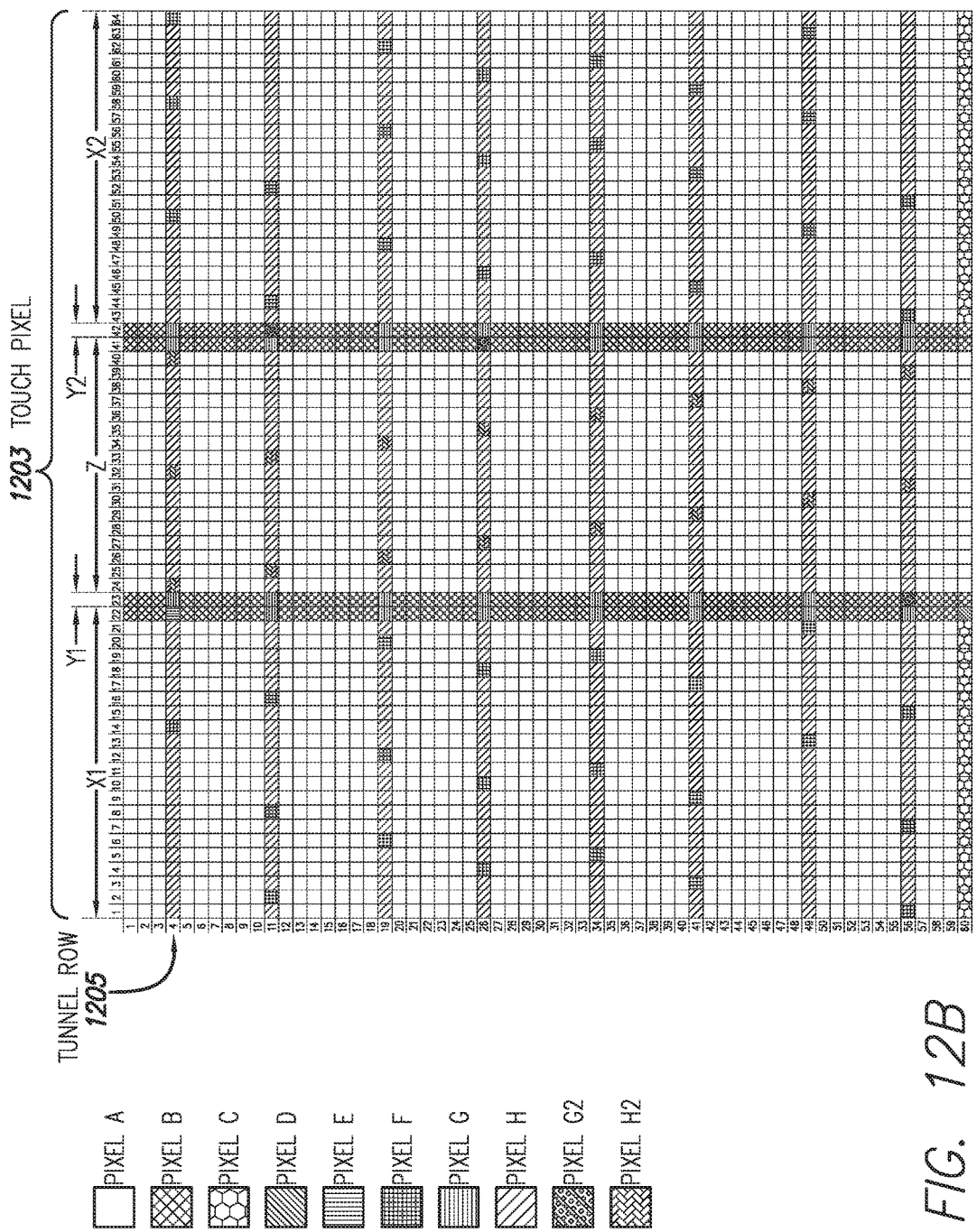

FIGS. 12A & 12B show an example layout of display pixels for one example touch pixel 1203. Touch pixel 1203 includes a region of 60×64 display pixels, each of the display pixels being one of display pixels A-H2 described above according to the legend of display pixels shown in the figure. FIG. 12A also shows an example touch screen 1201 including an example arrangement of 160 (16×10) touch pixels 1203. The display pixel layout creates groupings of display pixels that can substantially correspond to the drive region segments, and sense regions described above in reference to FIGS. 3-5, with the addition of grounding regions described below. In particular, the layout of display pixels forms two X regions (X1 and X2), two Y regions (Y1 and Y2), and one Z region. The X1 and X2 regions can be, for example, a right-half portion of a drive region segment and a left-half portion of another drive region segment, such as right-half portion 309 and left-half portion 313, respectively, in FIG. 3. The Z region can be, for example, a portion of a sense region such as sense line 223 of FIG. 3. The Y regions can be, for example, portions of grounding regions, in which the common electrodes of the display pixels can be connected together to form a conductive structure between a drive region segment and a sense region, and the conductive structure can be grounded by connections in a border region of touch screen 1201 to provide a grounded region that can help reduce interference between drive and sense regions. The particular configurations of the set of ten display pixels shown in FIGS. 7-10, along with the particular touch pixel layout shown in FIGS. 12A and 12B, can create a grouping of circuit elements that can be used in a touch sensing system to detect touch.

As can be seen in light of the FIGS. 7-10, and the legend of FIG. 12A, display pixels in columns 1-22 are connected together in the M3 layer to form the drive region X1. Grounding region Y1 includes display pixels in column 23. Sense region Z includes display pixels in columns 24-41. Grounding region Y2 includes display pixels in column 42. Drive region X2 includes display pixels in columns 43-64.

Drive regions X1 and X2 are electrically connected together through tunnel lines 711 in eight tunnel rows 1205 that extend throughout touch pixel 1203 in the x-direction. Each tunnel row 1205 can include a different arrangement of display pixels E, F, G, H, G2, and H2. Thus, tunnel lines 711 can extend through entire rows of display pixels in touch screen 1201 and can include multiple contacts, through conductive lines 1009 in pixels E and F, to the M3 layer connection grids in the drive regions. Thus, pixels E and F can be referred to as "contact pixels" because they include elements in their stackups that form an electrical connection/contact between the connected-together common electrodes and the tunnel lines. In other designs, tunnel rows can be shorter, e.g., the tunnel lines do not extend through the entire width of a drive region, and can include relatively few display pixels that include electrical connections between the tunnel lines and the connection grids. However, increasing the number of electrical connections between the tunnel lines and the connection grids of the drive regions can decrease the total resistance between drive regions.

FIG. 12B shows that the arrangement of the F pixels in each tunnel row 1205 can be different. In particular, the F pixels can be placed within each tunnel row 1205 such that there can be exactly one F pixel in each column of display pixels in the drive regions, with the exception of column 22, in which the contact pixel can be an E pixel. In this way, for example, the particular arrangement of F pixels, i.e., the placement of F pixels in the layout of touch pixel 1203, can reduce or eliminate the effect of the parasitic capacitance of the F pixels. As described above a parasitic capacitance between Vcom and a data line 723a can cause a reduced luminance of all of the display pixels in the column through which the data line 723a runs. Therefore, if one column of display pixels includes a number of F pixels, for example, placing an equal number of F pixels in an adjacent column can reduce or eliminate an effect (e.g., a visual artifact) of the parasitic capacitance of the F pixels in the first column. More specifically, F pixels in one column can reduce the luminance of the column, the effect of which can be a visual artifact due to the difference between the luminance of the column and the luminance of nearby columns. Placing F pixels in nearby columns can reduce or eliminate the difference in luminance of the columns, particularly if the number of F pixels placed in the adjacent and/or nearby columns is equal to the number of F pixels in the column. In the layout of touch pixel 1203, an equal number (e.g., one) of F pixels can be placed in display pixel columns of the drive regions X1 and X2, thus a visual artifact effect resulting from reduced luminance caused by parasitic capacitance of F pixels can be reduced or eliminated in the drive regions.

However, as shown in FIG. 12B, sense region Z can include no contact pixels, e.g., no F pixels. Consequently, the luminance of the sense region can be greater that the drive regions, which can cause a visual artifact. One way to reduce or eliminate this visual artifact can be to use a combination approach of placing an additional element in a pixel stackup, and also placing the pixels with the additional element in a particular arrangement in the layout of the touch pixel. Referring to FIG. 9, pixel H2 can include extension 917 that can have substantially the same overlap with a data line 723a as the overlap of vertical portion 912 in pixel F. Consequently, the parasitic capacitances between the Vcoms and data lines 723a of pixels F and H2 can be substantially the same. H2 pixels can be placed in an arrangement in tunnel rows 1205 such that there can be a single H2 pixel in each of the columns in the sense region (with the exception of column 41, which can include a G2 pixel). In this way, for example, the reduced luminance due to the placement of F pixels in the drive regions can be balanced by the placement of H2 pixels in the sense region, which can reduce or eliminate the effect of a visual artifact that could result from the parasitic capacitance of the F pixels in the drive regions.

As described above, the configurations of the contact pixels E and F, which can include the "contact" structure formed by conductive lines 1009, vertical portion 912, extension 910, and horizontal break 914, are different than the other types of display pixels. Referring to FIG. 10, it can be seen that due to the contact structure, which is covered by portions 1011 of black masks 1007, the areas of the right-hand sub-pixels (e.g., the blue sub-pixel) of the contact pixels E and F are somewhat smaller than the areas of the corresponding sub-pixels in the other display pixels A-D and G-H2. Therefore, pixels E and F can appear slightly dimmer than the other display pixels due to the reduce luminance of the sub-pixels. In one way to reduce or eliminate the effect of the dimmer contact pixels E and F, the contact pixels can be distributed irregularly, e.g., in an apparently random distribution, along each tunnel row 1205 in touch pixel 1203. In other words, looking at the topmost tunnel row of FIG. 12B and stepping down each tunnel row, it can be seen that the distribution of contact pixels changes irregularly from tunnel row to tunnel row. For example, in the first tunnel row, contact pixels are located at columns 14, 22, 50, 58, and 64; in the second tunnel row, contact pixels are located a columns 2, 8, 16, 44, and 52; in the third tunnel row, contact pixels are located at columns 6, 12, 20, 48, 56, and 62; etc. In this way, for example, visual artifacts that may be associated with the reduced luminance of individual contact pixels may be distributed in a way that makes them less visually perceptible to the human eye.

In contrast, it is noted that the distribution of H2 pixels in the portions of tunnel rows 1205 in the sense region can be substantially regular because the H2 pixels need not have reduced luminance due to a contact structure as in the pixels E and F.

Figure 13:
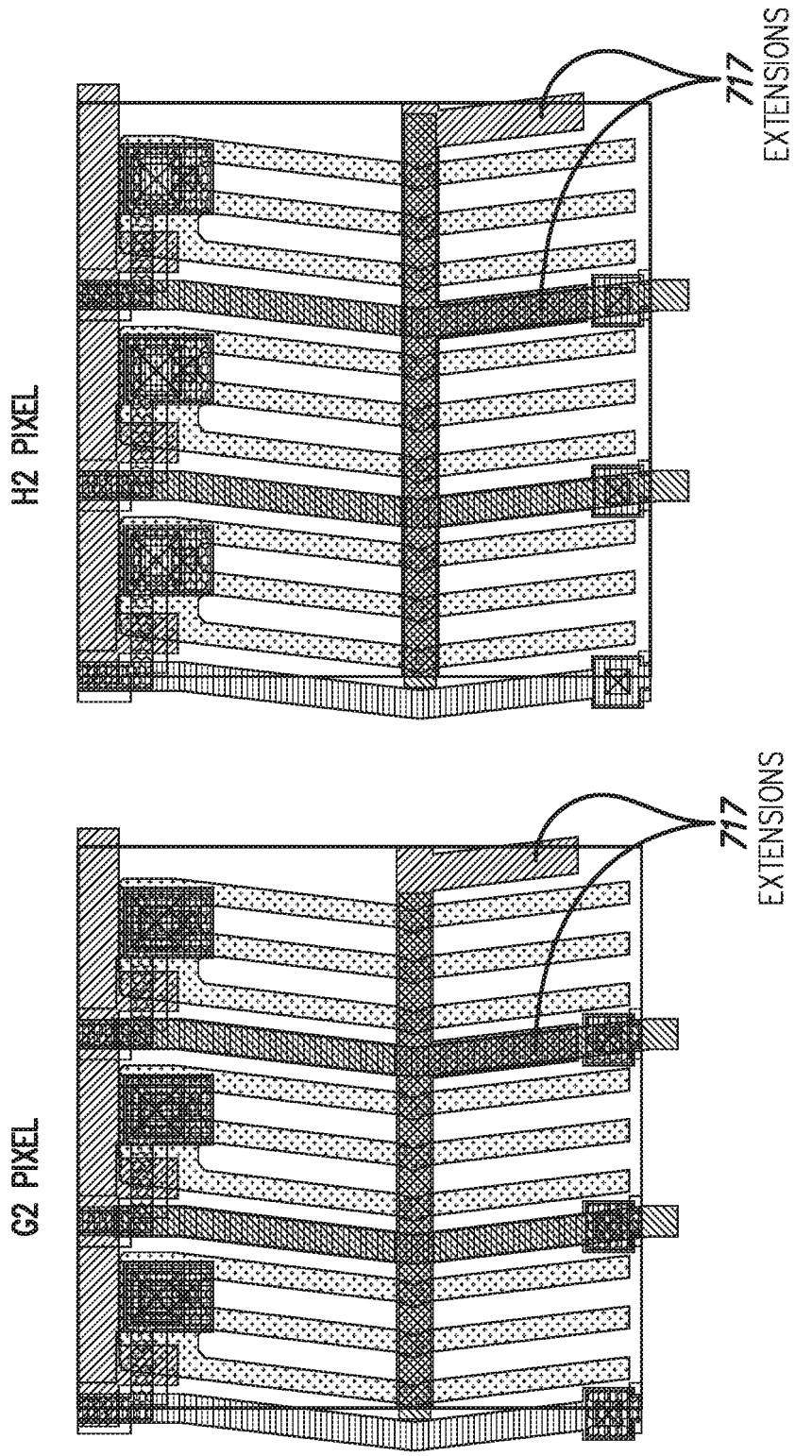
FIG. 13 illustrates more details of example display pixels according to embodiments of the disclosure.

Referring to FIGS. 7 and 13, another example of placing additional elements in the display pixel stackups and placing display pixels with the additional elements in a particular arrangement to reduce or eliminate the effect of a parasitic capacitance will now be described. As shown in FIG. 7, the contact pixels E and F can include vertical portions 715 in tunnel line 711, which is formed in the M1 layer. In each contact pixel, vertical portions 715 can overlap a data line 723 of the contact pixel and a data line 723a of a right-adjacent pixel, which can cause a parasitic capacitance between the tunnel line and the two data lines. Similar to the above example, additional elements can be added in the stackups of other display pixels to balance the parasitic capacitance between the tunnel lines and data lines in the contact pixels. In particular, extensions 717 of tunnel lines 711 of pixels G2 and H2 can be included. FIG. 13 shows pixels G2 and H2 in more detail. For clarity, extension 917 in the M3 layer of pixel H2 is not shown in FIG. 13. Similar to the example above, the arrangement of contact pixels E and F, and the arrangement of pixels G2 and H2 can be placed to reduce or eliminate an effect of the parasitic capacitance due to vertical portions 715 in the contact pixels.

Touch pixel 1203 can include an equal number of contact pixels (e.g., the total number of pixels E and F) in each tunnel row. Therefore, each tunnel row can have the same resistance between the M1 layer tunnel lines 771 and the M3 layer connection grids 901, which can help balance the effects of parasitic capacitances due to the contact pixels.

Although embodiments of this disclosure have been fully described with reference to the accompanying drawings, it is to be noted that various changes and modifications including, but not limited to, combining features of different embodiments, omitting a feature or features, etc., as will be apparent to those skilled in the art in light of the present description and figures.

For example, one or more of the functions of computing system 200 described above can be performed by firmware stored in memory (e.g. one of the peripherals 204 in FIG. 2) and executed by touch processor 202, or stored in program storage 232 and executed by host processor 228. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Example embodiments may be described herein with reference to a Cartesian coordinate system in which the x-direction and the y-direction can be equated to the horizontal direction and the vertical direction, respectively. However, one skilled in the art will understand that reference to a particular coordinate system is simply for the purpose of clarity, and does not limit the direction of the elements to a particular direction or a particular coordinate system. Furthermore, although specific materials and types of materials may be included in the descriptions of example embodiments, one skilled in the art will understand that other materials that achieve the same function can be used. For example, it should be understood that a "metal layer" as described in the examples below can be a layer of any electrically conductive material.

In some embodiments, the drive lines and/or sense lines can be formed of other elements including, for example other elements already existing in typical LCD displays (e.g., other electrodes, conductive and/or semiconductive layers, metal lines that would also function as circuit elements in a typical LCD display, for example, carry signals, store voltages, etc.), other elements formed in an LCD stackup that are not typical LCD stackup elements (e.g., other metal lines, plates, whose function would be substantially for the touch sensing system of the touch screen), and elements formed outside of the LCD stackup (e.g., such as external substantially transparent conductive plates, wires, and other elements). For example, part of the touch sensing system can include elements similar to known touch panel overlays.

In this example embodiment, each sub-pixels can be a red (R), green (G) or blue (B) sub-pixel, with the combination of all three R, G and B sub-pixels forming one color display pixel. Although this example embodiment includes red, green, and blue sub-pixels, a sub-pixel may be based on other colors of light or other wavelengths of electromagnetic radiation (e.g., infrared) or may be based on a monochromatic configuration.

What is claimed is:

1. A touch screen comprising:
a plurality of display pixels with stackups that each include a first element and a second element, the first element disposed in a first material layer of the stackups and the second element disposed in a second material layer of the stackups, wherein the plurality of display pixels includes:
 a first display pixel including a third element connected to the first element, the third element contributing to a first parasitic capacitance of the first display pixel, the third element disposed in a third material layer of the stackups, different from the first material layer and the second material layer; and
 a second display pixel lacking the third element and including a fourth element, the fourth element contributing to a second parasitic capacitance of the second display pixel such that the first and second parasitic capacitances are substantially equal, wherein the first display pixel does not include the fourth element.

2. The touch screen of claim 1, wherein the fourth element is disposed in the second material layer of the stackups.

3. The touch screen of claim 1, wherein one of the first layer and the second layer is for sensing a touch on the touch screen.

4. The touch screen of claim 1, wherein a first plurality of electrically connected second elements includes the respective second element of the first display pixel and the respective second element of the second display pixel, and a total parasitic capacitance of the first plurality of second elements includes the first and second capacitances.

5. The touch screen of claim 4, further comprising a second plurality of electrically connected second elements, wherein the first and second pluralities of second elements include an equal number of second elements of first display pixels, such that the total parasitic capacitances of the first and second pluralities of second elements are balanced.

6. The touch screen of claim 1, incorporated within a computing system.

7. The touch screen of claim 1, wherein:
the first element is a touch electrode in a touch phase of the touch screen and a common electrode in a display phase of the touch screen;
the second element is a portion of a data line configured to transmit touch data in the touch phase and transmit image data in the display phase;
the third element is a conductive line configured to electrically connect the first display pixel to one or more other display pixels on the touch screen; and
the fourth element is a conductive extension electrically connected to the second element of the second display pixel.

8. A method for generating an image on a touch screen including a plurality of display pixels, the method comprising:
operating a first display pixel of the plurality of display pixels to display the image, the plurality of display pixels having stackups that each include a first element and a second element, the first element disposed in a first material layer of the stackups and the second element disposed in a second material layer of the stackups, the first display pixel including:
 a third element connected to the first element, the third element contributing to a first parasitic capacitance of the first display pixel, the third element disposed in a third material layer of the stackup of the first display pixel, different from the first material layer and the second material layer; and
operating a second display pixel of the plurality of display pixels to display the image, the second display pixel lacking the third element and including a fourth element, the fourth element contributing to a second parasitic capacitance of the second display pixel such that the first and second parasitic capacitances are substantially equal,
wherein the first display pixel does not include the fourth element.

9. The method of claim 8, wherein the fourth element is disposed in the second material layer of the stackups.

10. The method of claim 8, wherein one of the first layer and the second layer is for sensing a touch on the touch screen.

11. The method of claim 8, wherein the touch screen comprises a first plurality of electrically connected second elements including the respective second element of the first display pixel and the respective second element of the second display pixel, and a total parasitic capacitance of the first plurality of second elements includes the first and second capacitances.

12. The method of claim 11, wherein the touch screen further comprises a second plurality of electrically connected second elements, wherein the first and second pluralities of second elements include an equal number of second elements of first display pixels, such that the total parasitic capacitances of the first and second pluralities of second elements are balanced.

13. The method of claim 8, wherein:
the first element is a touch electrode in a touch phase of the touch screen and a common electrode in a display phase of the touch screen;
the second element is a portion of a data line configured to transmit touch data in the touch phase and transmit image data in the display phase;
the third element is a conductive line configured to electrically connect the first display pixel to one or more other display pixels on the touch screen; and
the fourth element is a conductive extension electrically connected to the second element of the second display pixel.

14. A touch screen comprising:
a plurality of display pixels with stackups that each include a first element and a second element, wherein the plurality of display pixels includes:
 a first display pixel including a third element connected to the first element, the third element contributing to a first parasitic capacitance of the first display pixel;
 a second display pixel lacking the third element and including a fourth element, the fourth element contributing to a second parasitic capacitance of the second display pixel such that the first and second parasitic capacitances are substantially equal;
 a third display pixel, adjacent to the first display pixel along a first direction, wherein the first element of the third pixel is electrically connected to the first element of the first display pixel via the third element of the first display pixel; and
 a fourth display pixel, adjacent to the second display pixel along the first direction, wherein the first element of the fourth pixel is not electrically connected to the first element of the second display pixel.

15. The touch screen of claim 14, wherein:
the first element is a touch electrode in a touch phase of the touch screen and a common electrode in a display phase of the touch screen;
the second element is a portion of a data line configured to transmit touch data in the touch phase and transmit image data in the display phase; and
the fourth element is a conductive extension electrically connected to the second element of the second display pixel.

16. The touch screen of claim 14, wherein a first plurality of electrically connected second elements includes the respective second element of the first display pixel and the respective second element of the second display pixel, and a total parasitic capacitance of the first plurality of second elements includes the first and second capacitances.

17. The touch screen of claim 16, further comprising a second plurality of electrically connected second elements, wherein the first and second pluralities of second elements include an equal number of second elements of first display pixels, such that the total parasitic capacitances of the first and second pluralities of second elements are balanced.

18. The touch screen of claim 14, incorporated within a computing system.

19. The touch screen of claim 14, wherein the third element of the first display pixel electrically connects a common electrode of the first display pixel with one or more respective common electrodes of one or more other display pixels on the touch screen, including the third display pixel.

20. A method for generating an image on a touch screen including a plurality of display pixels, the method comprising:
operating a first display pixel of the plurality of display pixels to display the image, the plurality of display pixels having stackups that each include a first element and a second element, the first display pixel including a third element, the third element connected to the first element, the third element contributing to a first parasitic capacitance of the first display pixel;
operating a second display pixel of the plurality of display pixels to display the image, the second display pixel lacking the third element, the second display pixel including a fourth element, the fourth element contributing to a second parasitic capacitance of the second display pixel such that the first and second parasitic capacitances are substantially equal;
operating a third display pixel of the plurality of display pixels to display the image, wherein the third display pixel is adjacent to the first display pixel along a first direction and the first element of the third display pixel is electrically connected to the first element of the first display pixel via the third element of the first display pixel; and
operating a fourth display pixel of the plurality of display pixels to display the image, wherein the fourth display is adjacent to the second display pixel along the first direction and the first element of the fourth pixel is not electrically connected to the first element of the second display pixel.

21. The method of claim 20, wherein:
the first element is a touch electrode in a touch phase of the touch screen and a common electrode in a display phase of the touch screen;
the second element is a portion of a data line configured to transmit touch data in the touch phase and transmit image data in the display phase; and
the fourth element is a conductive extension electrically connected to the second element of the second display pixel.

22. The method of claim 20, wherein the touch screen comprises a first plurality of electrically connected second elements includes the respective second element of the first display pixel and the respective second element of the second display pixel, and a total parasitic capacitance of the first plurality of second elements includes the first and second capacitances.

23. The method of claim 20, wherein the touch screen further comprises a second plurality of connected second elements, wherein the first and second pluralities of second elements include an equal number of second elements of first display pixels, such that total parasitic capacitances of the first and second plurality of second elements are balanced.

24. The method of claim 20, wherein the third element of the first display pixel electrically connects a common electrode of the first display pixel with one or more respective common electrodes of one or more other display pixels on the touch screen, including the third display pixel.

* * * * *